(12) United States Patent
Prüssmeier

(10) Patent No.: US 9,689,712 B2
(45) Date of Patent: Jun. 27, 2017

(54) POSITION DETECTION DEVICE FOR A MOVABLE ELEMENT IN A DRIVE DEVICE

(71) Applicant: Beckhoff Automation GmbH, Verl (DE)

(72) Inventor: Uwe Prüssmeier, Lemgo (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 215 days.

(21) Appl. No.: 14/497,516

(22) Filed: Sep. 26, 2014

(65) Prior Publication Data

US 2015/0048817 A1    Feb. 19, 2015

Related U.S. Application Data

(63) Continuation of application No. PCT/EP2013/052068, filed on Feb. 1, 2013.

(30) Foreign Application Priority Data

Mar. 27, 2012  (DE) .................. 10 2012 204 917

(51) Int. Cl.
*G01D 5/22* (2006.01)
*G01D 5/20* (2006.01)
(Continued)

(52) U.S. Cl.
CPC ............. *G01D 5/22* (2013.01); *G01D 5/2086* (2013.01); *H02K 11/225* (2016.01); *H02K 41/031* (2013.01)

(58) Field of Classification Search
CPC ...... G01D 5/22; G01D 5/2086; H02K 11/225; H02K 41/031
(Continued)

(56) References Cited

U.S. PATENT DOCUMENTS 5,134,324 A   7/1992 Sakagami et al.
5,701,042 A   12/1997 Takei
(Continued)

FOREIGN PATENT DOCUMENTS

AT   509101 A1   6/2011
CN   1295000 A   5/2001
(Continued)

OTHER PUBLICATIONS

Machine English Translation of JP2000-055647 published Feb. 25, 2000.*

(Continued)

*Primary Examiner* — Billy Lactaoen
(74) *Attorney, Agent, or Firm* — Dorsey & Whitney LLP

(57) ABSTRACT

A position detection device for detecting a position of a movable element in a drive device comprises a carrier having two detecting modules for detecting a position of the movable element, the detecting modules being arranged side-by-side at a predetermined distance and without overlapping. Each detecting module comprises an energizing coil and a receiving coil assigned to the energizing coil and comprising a geometry having one period. The detecting modules are configured to output a position signal when detecting the movable element, so that during a shift of the movable element along the two detecting modules over the predefined distance this distance may be measured as a reference distance on the basis of the position signals.

18 Claims, 20 Drawing Sheets

(51) Int. Cl.
*H02K 41/03* (2006.01)
*H02K 11/225* (2016.01)

(58) Field of Classification Search
USPC .................................................. 324/207.17
See application file for complete search history.

(56) References Cited

U.S. PATENT DOCUMENTS

| | | | |
|---|---|---|---|
| 6,011,389 A | 1/2000 | Masreliez et al. | |
| 6,611,138 B2 | 8/2003 | Vasiloiu | |
| 6,664,665 B2 | 12/2003 | Hsiao | |
| 6,781,524 B1 | 8/2004 | Clark et al. | |
| 6,876,107 B2 | 4/2005 | Jacobs | |
| 6,920,699 B2 | 7/2005 | Reusing et al. | |
| 7,170,241 B1 | 1/2007 | Faizullabhoy et al. | |
| 2002/0049553 A1 | 4/2002 | Schmid et al. | |
| 2002/0104716 A1 | 8/2002 | Zaharia | |
| 2003/0230941 A1 | 12/2003 | Jacobs | |
| 2004/0163270 A1 | 8/2004 | Reusing et al. | |
| 2005/0173991 A1 | 8/2005 | Watarai et al. | |
| 2006/0001518 A1* | 1/2006 | Hayashi | G01D 5/2046 336/200 |
| 2008/0036305 A1 | 2/2008 | Raos | |
| 2008/0265691 A1 | 10/2008 | Shikayama et al. | |
| 2009/0230785 A1 | 9/2009 | Ida et al. | |
| 2011/0278958 A1 | 11/2011 | Kawakami | |
| 2012/0223724 A1 | 9/2012 | Vasiloiu et al. | |
| 2013/0270928 A1 | 10/2013 | Nord | |

FOREIGN PATENT DOCUMENTS

| | | |
|---|---|---|
| CN | 1933304 A | 3/2007 |
| CN | 1954477 A | 4/2007 |
| CN | 101292412 A | 10/2008 |
| CN | 100592609 C | 2/2010 |
| CN | 102255470 A | 11/2011 |
| DE | 69003365 T2 | 2/1994 |
| DE | 10138164 A1 | 2/2003 |
| DE | 10300918 A1 | 7/2004 |
| DE | 102004057205 A1 | 6/2005 |
| DE | 102004050337 B3 | 2/2006 |
| EP | 1164358 B1 | 8/2005 |
| EP | 1758231 A1 | 2/2007 |
| JP | H02264306 A | 10/1990 |
| JP | 04210771 A | 7/1992 |
| JP | 06165475 A | 6/1994 |
| JP | 10066327 A | 3/1998 |
| JP | H11173872 A | 7/1999 |
| JP | 2000014119 A | 1/2000 |
| JP | 2000055647 A * | 2/2000 |
| JP | 2000324789 A | 11/2000 |
| JP | 2003247861 A | 9/2003 |
| JP | 2007288967 | 11/2007 |
| JP | 2010074977 A | 4/2010 |
| JP | 2011097750 A | 5/2011 |
| WO | 96/27544 | 9/1996 |
| WO | 2011/129773 A1 | 10/2011 |

OTHER PUBLICATIONS

First Office Action for related Chinese patent application No. 2013800175368 (4 pages).
First Chinese Office Action for Chinese Patent Application No. 201380022569.1, dated Mar. 21, 2016 (7 pages).
First Chinese Office Action for Chinese Patent Application No. 201380017399.8, dated May 10, 2016 (7 pages).

* cited by examiner

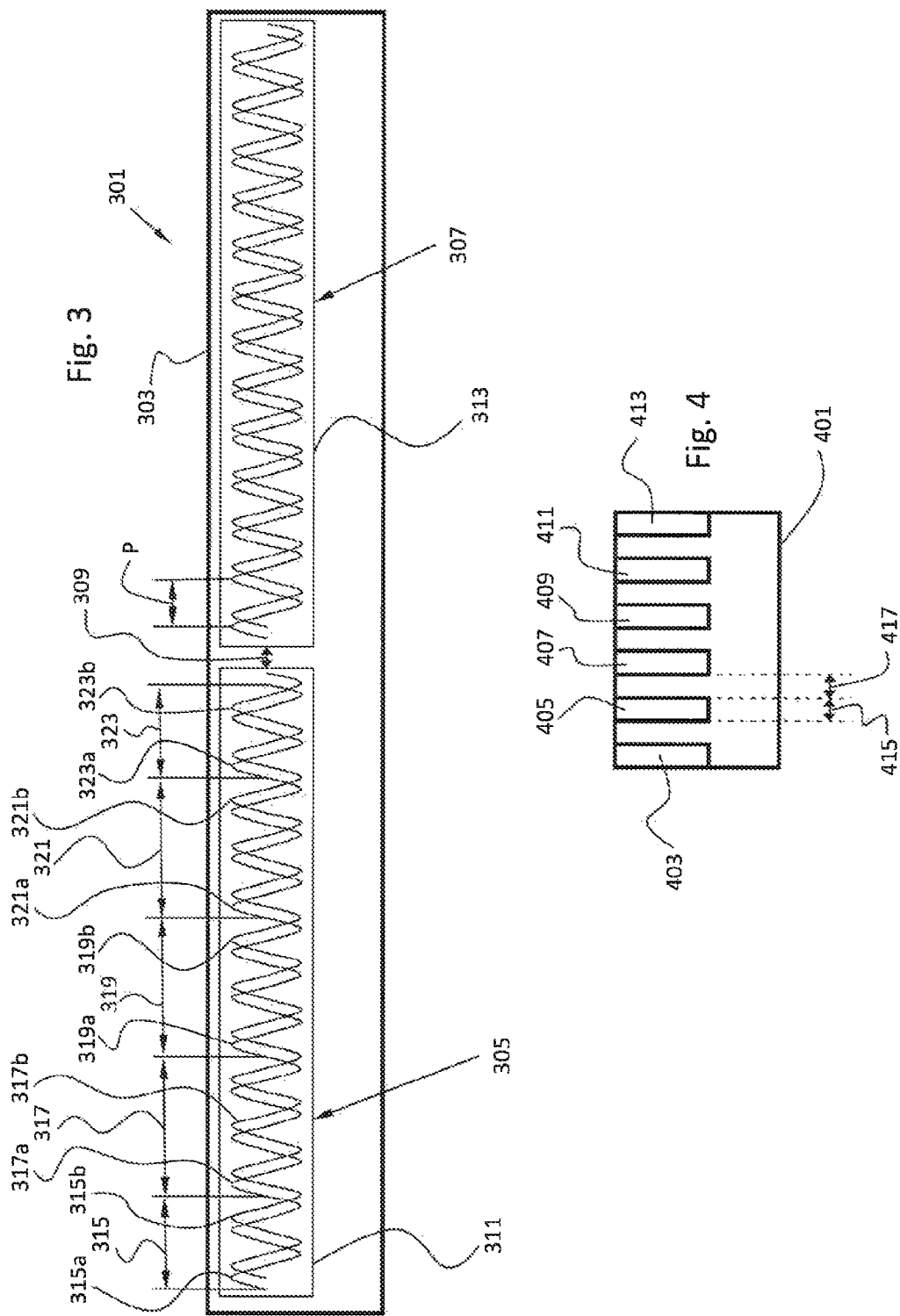

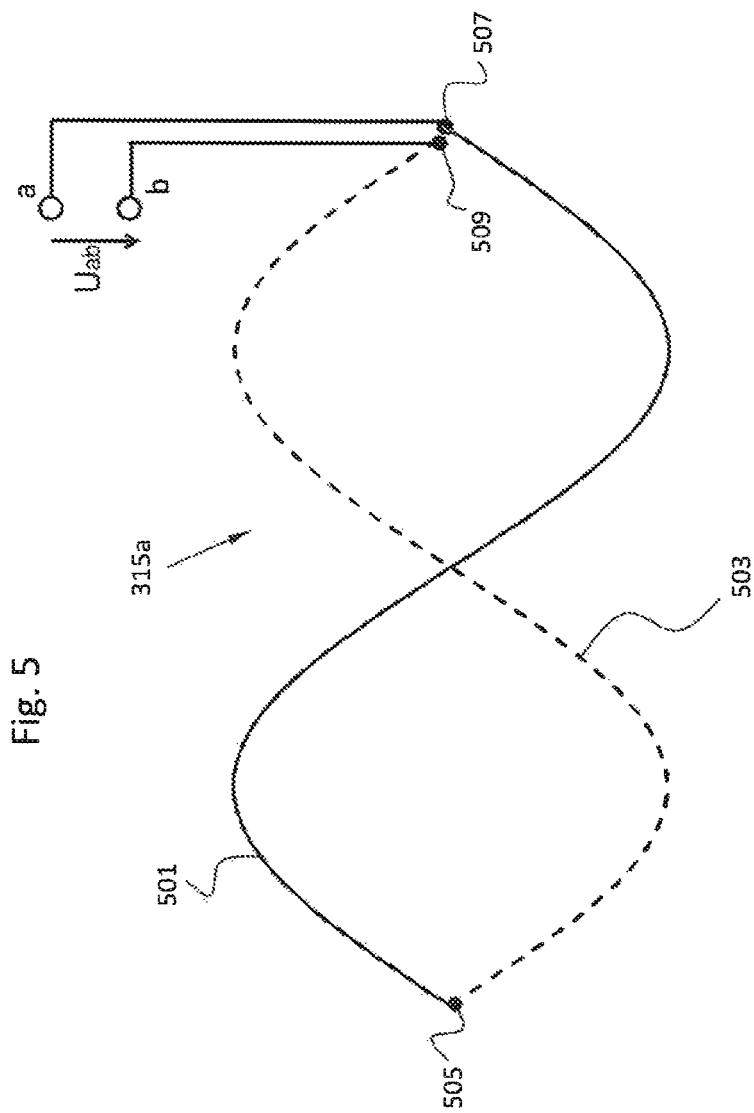

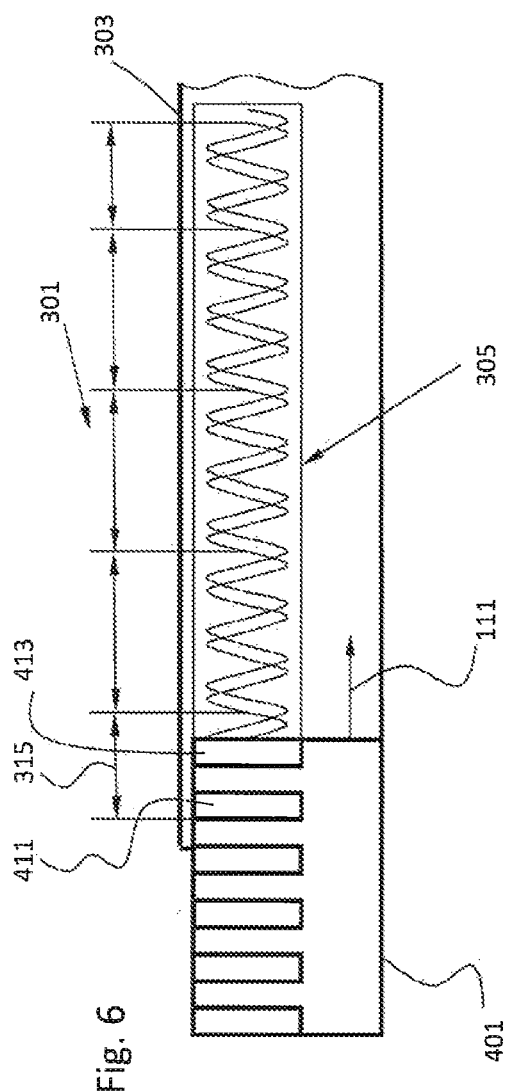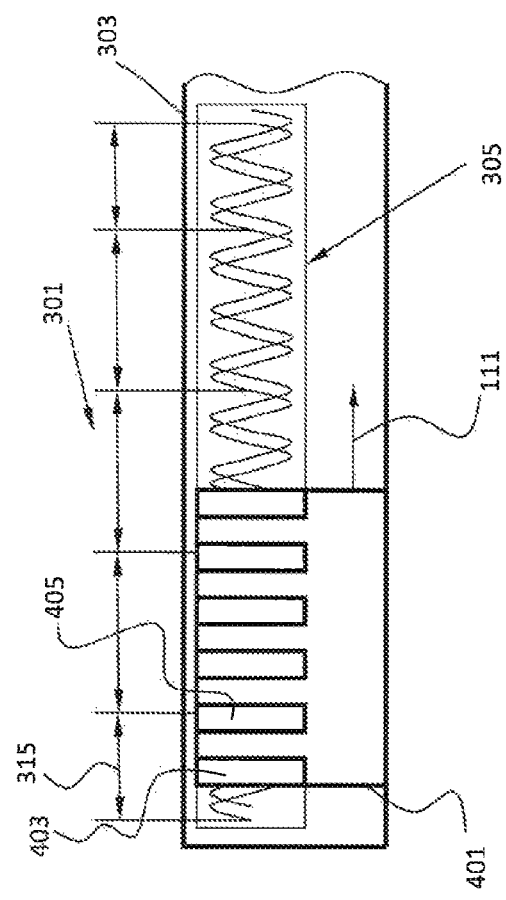

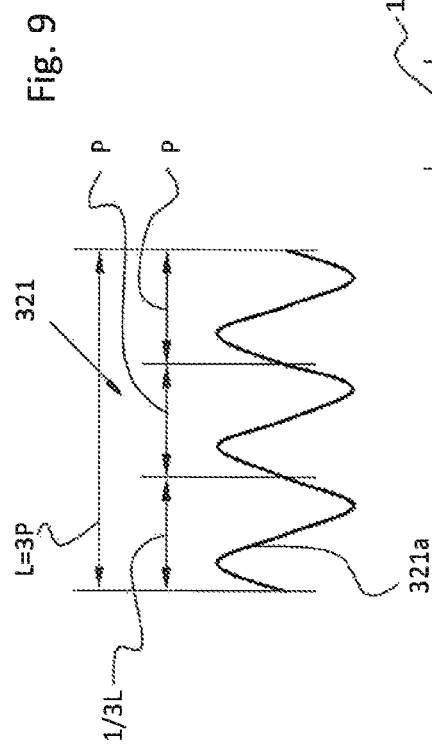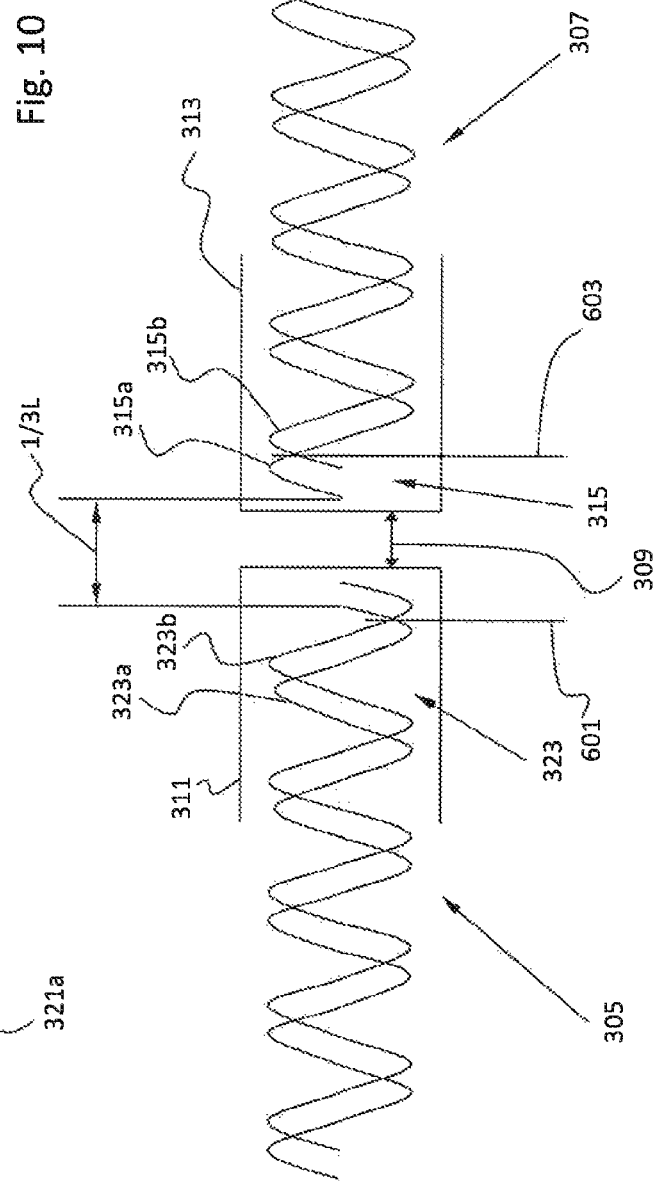

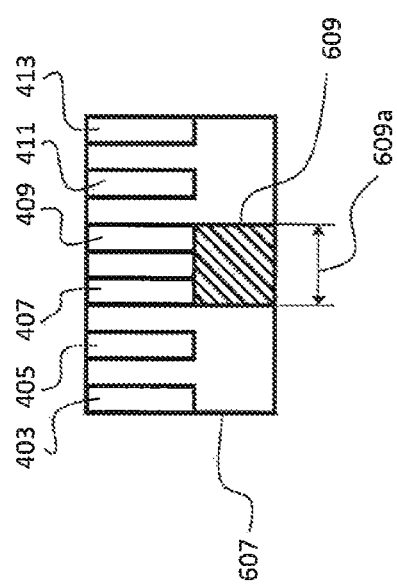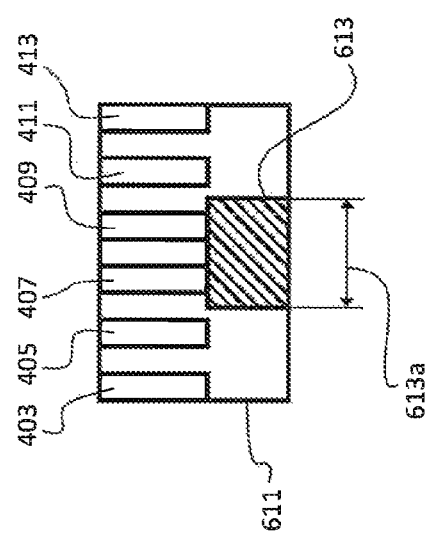

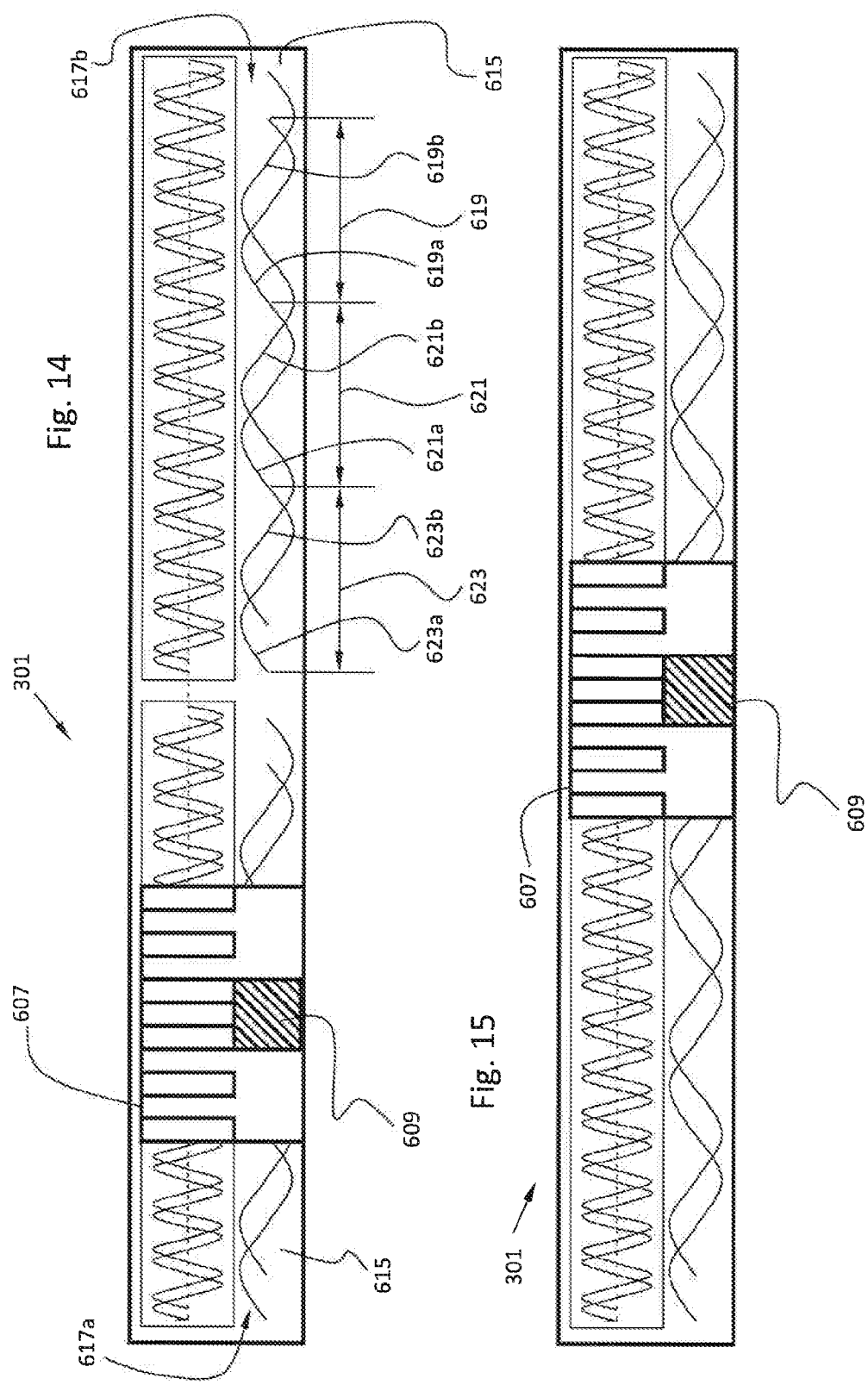

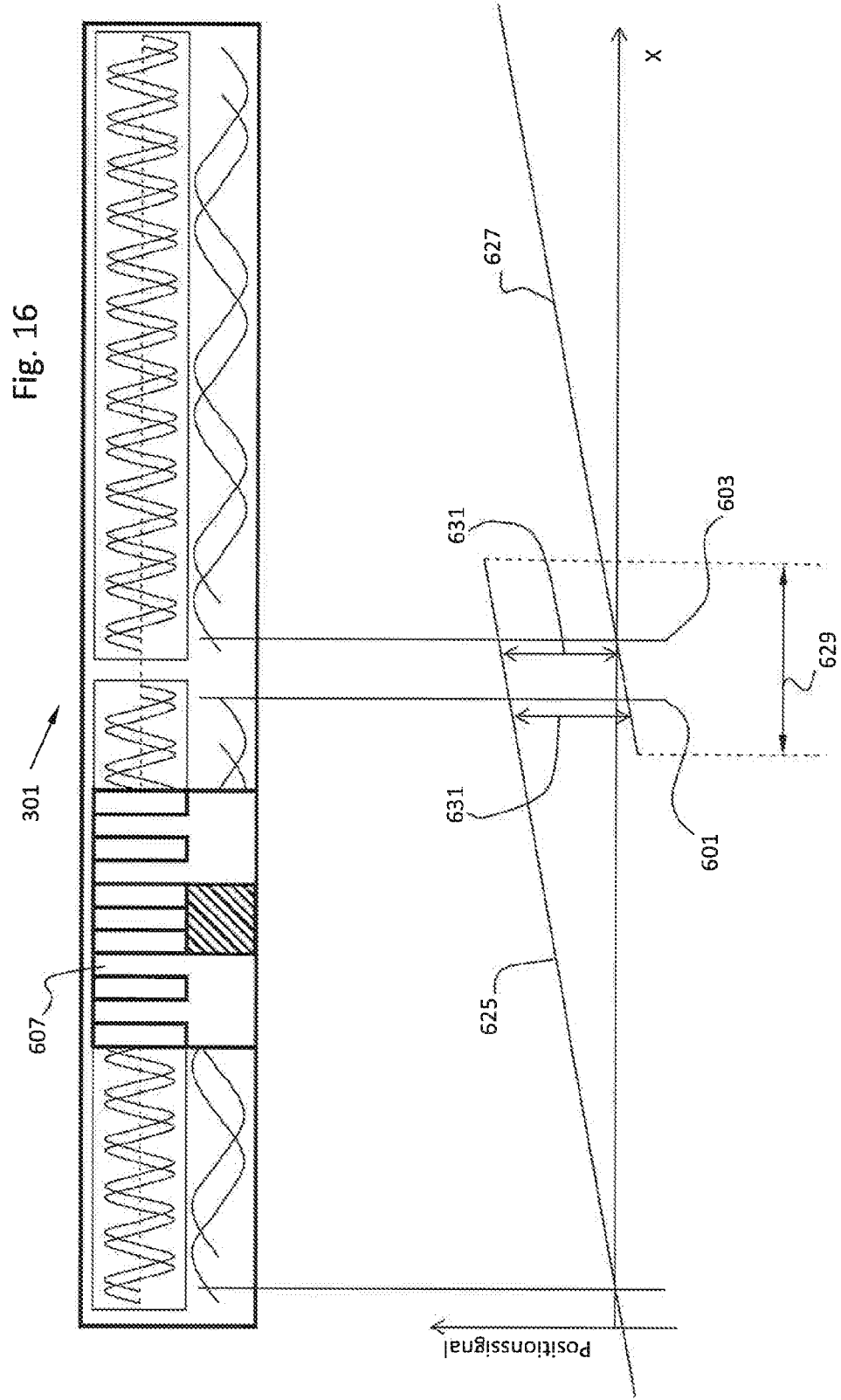

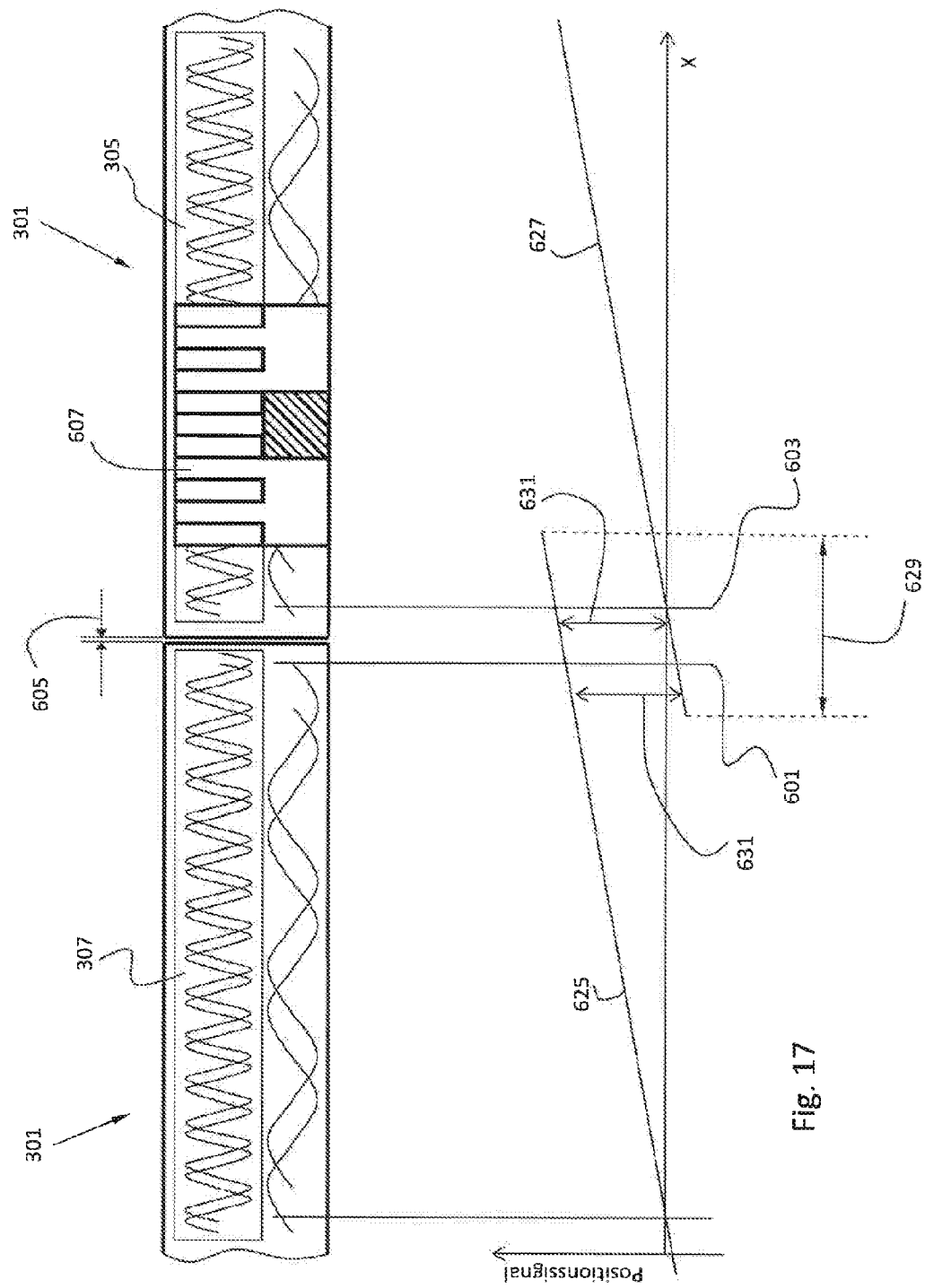

POSITION DETECTION DEVICE FOR A MOVABLE ELEMENT IN A DRIVE DEVICE

CROSS-REFERENCE TO RELATED APPLICATIONS

This application is a continuation of International Patent Application No. PCT/EP2013/052068, filed on Feb. 1, 2013, which claims priority to German Patent Application No. DE 10 2012 204 917.7, filed on Mar. 27, 2012, each of which is incorporated by reference herein, in the entirety and for all purposes.

FIELD

The present invention relates to a position detection device and to a drive device.

BACKGROUND

Patent specification U.S. Pat. No. 6,781,524 discloses a position detection system for vehicles which move along a travel path. The known system comprises a magnetic element which is respectively arranged at the vehicles. Sensor coils are arranged on the travel path. If a vehicle crosses such a sensor coil with its magnetic element, a magnetic flux is generated in the sensor coil by means of the magnetic element. The magnetic flux may then be determined by measuring a sensor coil voltage so that a presence of the vehicle above the sensor coil may be detected.

A disadvantage involved herein is e.g. that considerable time passes before the vehicle position may be determined on the basis of the measured sensor coil voltage. The reason for this is particularly that a continuous periodic voltage signal is applied to the sensor coil so that for the purpose of position detection only a continuous measuring signal is provided, wherein in this context the envelope of the measuring signal is determined over the course of several periods, which takes up a considerable amount of time.

The publication US 2002/0049553 A1 discloses a linear motor comprising a stator and an armature. The armature comprises several permanent magnets. The stator comprises two Hall sensors which are arranged at a distance from each other and which serve to detect the position of the armature and to determine a position error of the armature. The disadvantage of this known configuration is particularly that unknown structural distances between sensor elements may not be detected.

The known systems are furthermore disadvantageous insofar as a distance exists between the two sensor coils for structural reasons. The distance is usually unknown or it may change during operation, respectively. For example, a change of temperature may have the effect of a changing distance between two sensor coils or the two Hall sensors. However, a distance which is not exactly known usually results in that a position of the vehicle or of the armature may not be precisely determined. This may furthermore result in the movement of the vehicle or of the armature exhibiting irregularities, e.g. jerky movements of the motor vehicles or of the armature. Thus, it is not possible to control a smooth movement of the vehicles or of the armature.

SUMMARY

The present invention provides an improved position detection device and an improved method a drive device.

According to one aspect of the invention, a position detection device for detecting a position of a movable element in a drive device comprises a carrier having two detecting modules for detecting a position of the movable element, the detecting modules being arranged side-by-side at a predetermined distance and without overlapping. Each detecting module comprises an energizing coil and a receiving coil assigned to the energizing coil and comprising a geometry having one period. The detecting modules are configured to output a position signal when detecting the movable element, so that during a shift of the movable element along the two detecting modules over the predefined distance this distance may be measured as a reference distance on the basis of the position signals.

According to a further aspect of the invention, a drive device comprises at least a movable element, a travel path and a position detection device. The position detection device has two carriers which are arranged side-by-side on the travel path, a distance being provided between the two carriers, the carriers each comprising two detecting modules for detecting a position of the movable element, the detecting modules being arranged side-by-side at a predetermined distance and without overlapping. Each detecting module is configured to output a position signal when detecting the movable element, so that during a shift of the movable element along the two detecting modules over the predefined distance this distance may be measured as a reference distance on the basis of the position signals, so that during a shift of the movable element along the two carriers over the distance an absolute value of the distance may be determined on the basis of the reference distance, wherein a length of the movable element is larger than both the predefined distance provided between two detecting modules of each carrier and the distance provided between the two carriers.

According to a further aspect of the invention, a drive device comprises a first movable element having a first electrically conductive area, a second movable element having a second electrically conductive area, a travel path, and a carrier. The carrier has a first detecting module and a second detecting module, the detecting modules each for detecting a position of the movable elements, the first detecting module being arranged upon the second detecting module, the detecting modules each comprising an energizing coil and a receiving coil assigned to the energizing coil and comprising a geometry having one period. The detecting modules are configured to output a position signal when detecting the movable elements, wherein the first conductive area of the first movable element causes a different interference with the second detecting module than the second conductive area of the second movable element.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 shows a further position detection device.

FIG. 4 shows a component with electrically conductive areas.

FIG. 5 depicts windings of a receiving coil.

FIGS. 6, 7 and 8 depict a shift of the component of FIG. 4 along the position detection device of FIG. 3.

FIG. 9 shows a sinusoidal receiving coil comprising three periods.

FIG. 10 shows an enlarged partial view of the two detecting modules of the position detection device of FIG. 3.

FIG. 12 shows a further component comprising electrically conductive areas.

FIG. 13 depicts another different component comprising electrically conductive areas.

FIGS. 14 and 15 show a shift of the component of FIG. 12 along a position detection device comprising a detecting area.

FIG. 16 depicts a shift of the component of FIG. 12 along the position detection device of FIGS. 14 and 15, a graphic development of a position signal over the travel distance being shown in addition.

FIG. 17 depicts a shift of the component of FIG. 12 along two position detection devices of FIGS. 14 to 16 which are arranged side-by-side, a graphic development of a position signal over the travel path being shown in addition.

DETAILED DESCRIPTION

Figure 2:
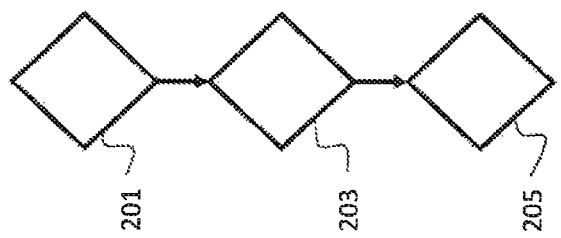
FIG. 2 depicts a flow chart of a method for detecting a position of a movable element in a drive device.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In the following, same reference numerals may be used for the same features. For clarity reasons, Figures do not always comprise all reference numerals.

Figure 1:
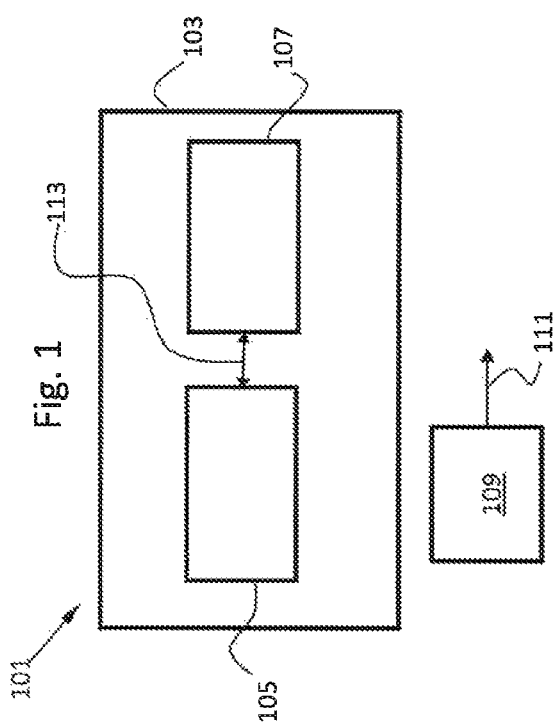
FIG. 1 shows a position detection device.

FIG. 1 depicts a position detection device 101 for detecting a position of a movable element 109 in a drive device. The position detection device 101 comprises a carrier 103, the carrier 103 comprising two detecting modules 105 and 107. The two detecting modules 105 and 107 are configured to output a position signal when detecting the movable element 109. A shift of the movable element 109 along the position detection device 101 is symbolically indicated by means of an arrow having the reference numeral 111.

The two detecting modules 105 and 107 are arranged at the carrier 103 side-by-side, at a predefined distance with regard to each other and without overlapping. The predefined distance between the two detecting modules 105 and 107 is indicated by means of a double-arrow having the reference numeral 113.

When shifting the movable element 109 along the first detecting module 105 over the predefined distance 113 and along the second detecting module 107, corresponding position signals of the two detecting modules 105 and 107 are measured so that the predefined distance 113 is measurable or, respectively, may be measured as the reference distance on the basis of said position signals. Thus, a correlation between position signals on the one hand and the predefined distance 113 on the other hand may advantageously be generated. Usually, the predefined distance 113 is known so that an absolute calibration of the position signals is also allowed for. If a further position detection device is arranged beside the position detection device 101, a distance between the two position detection devices may be formed for structural reasons. On the one hand, this distance is usually not known due to installation tolerances, on the other hand this distance may change e.g. due to temperature variations during operation of the drive device. A precise position detection or, respectively, position determination of the movable element 109 along its travel path or, respectively, the stretch of way is thus no longer possible. Since, however, the predefined distance 113 was measured as the reference distance, it is sufficient to measure the position signals of the respective detecting modules of the two position detection devices if the movable element 109 is shifted from the position detection device 101 to the further position detection device. From these position signals, the distance between the two position detection devices may be exactly determined or, respectively, measured or, respectively, a change of this distance may be compensated for by calculation on the basis of the reference distance or, respectively, the corresponding position signals which were used for the reference measurement.

FIG. 2 shows a flow chart of a method for detecting a position of a movable element in a drive device by means of a position detection device. The position detection device may e.g. be the position detection device 101 of FIG. 1.

According to step 201, the movable element is shifted along the two detecting modules over the predefined distance. According to step 203, the corresponding position signals of the two detecting modules during the shift are measured. Based on these position signals, the predefined distance between the two detecting modules may be measured as the reference distance in step 205.

FIG. 3 shows a further position detecting device 301. The position detection device 301 comprises a rectangular carrier 303 which may preferably be configured as a printed circuit board. At the carrier 303, two detecting modules 305 and 307 are arranged side-by-side, without overlapping and at a distance from each other. This predefined distance between the two detecting modules 305 and 307 is indicated by means of a double-arrow having the reference numeral 309.

Both detecting modules 305 and 307 are formed identically so that in the following only detecting module 305 is described in detail. Furthermore, for the sake of clarity, the reference numerals used for this purpose are mainly only indicated for the corresponding elements of detecting module 305.

The detecting module 305 comprises an energizing coil 311 which has a square shape. Within the square energizing coil 311, a plurality of receiving coil pairs 315, 317, 319, 321 and 323 is formed. Here, the receiving coil pairs 315, 317, 319, 321 and 323 are arranged side-by-side. The receiving coil pairs 315, 317, 319, 321 and 323 have a periodic geometry; to be precise, according to FIG. 3 this is a sinusoidal or, respectively, cosinusoidal geometry. A period of this geometry is in the following referred to as "P".

The double-arrows and limitation lines indicated in FIG. 3 with regard to the detecting module 305 symbolically indicated the top and the end of the respective receiving coil pair.

The receiving coil pair 305 is formed of a sinusoidal winding or, respectively, coil 315a and a cosinusoidal winding or, respectively, coil 315b. The receiving coil pair 317 is formed of a sinusoidal winding or, respectively, coil 317a and a cosinusoidal winding or, respectively, coil 317b. The receiving coil pair 319 is formed of a sinusoidal winding or, respectively, coil 319a and a cosinusoidal winding or, respectively, coil 319b. The receiving coil pair 321 is formed of a sinusoidal winding or, respectively, coil 321a and a cosinusoidal winding or, respectively, coil 321b. The receiving coil pair 323 is formed of a sinusoidal winding or, respectively, coil 323a and a cosinusoidal winding or, respectively, coil 323b.

Coils or, respectively, windings having a sinusoidal geometry may generally and preferably be referred to as sinusoidal coils or, respectively, as sinusoidal windings. Coils or, respectively, windings having a cosinusoidal geometry may generally and preferably be referred to as cosinusoidal coils or, respectively, as cosinusoidal windings.

The two receiving coil pairs 315 and 323 or, respectively, the corresponding sinusoidal and cosinusoidal windings or, respectively, coils each comprise two periods P. The windings or, respectively, coils of the receiving coil pairs 317, 319, 323 each comprise three periods P.

A schematic view of such a winding or, respectively, coil of a receiving coil pair is described in more detail in FIG. 5.

FIG. 4 shows a rectangular component 401 comprising electrically conductive areas 403, 405, 407, 409, 411 and 413 which are formed identically and have a rectangular shape. A width of these areas is schematically indicated by means of a double-arrow having the reference numeral 415. A distance between two electrically conductive areas is indicated schematically by means of a double arrow having the reference numeral 417.

The six electrically conductive areas 403, 405, 407, 409, 411 and 413 are arranged in parallel with regard to one another and in a comb-like shape, the respective width 415 of the electrically conductive areas 403, 405, 407, 409, 411 and 413 amounting to half a period P. The distance 417 between two electrically conductive areas is also half a period P.

Said electrically conductive areas 403, 405, 407, 409, 411 and 413 may e.g. be configured as a metalized surface area. This particularly means that the surface of component 401 was or, respectively, is metalized at the corresponding locations.

The component 401 may e.g. be arranged at a vehicle or, respectively, at a slide which is shifted along a travel path or, respectively, a stretch of way by means of the drive device. The position detection device 301 is then also arranged alongside the travel path so that during a shift of the vehicle alongside the travel path, the component 401 is shifted along the position detection device 301. When charging the energizing coils 311 and 313, corresponding voltages are induced in the individual receiving coil pairs 315, 317, 319, 321, 323, i.e. in the corresponding cosinusoidal and sinusoidal windings. If the component 401 is shifted along the windings, the electrically conductive areas 403, 405, 407, 409, 411 and 413 will interact with the magnetic fields generated in accordance with the induced voltages, which becomes obvious from a change in the induced voltages. This change may be measured and on the basis thereof, a position detection of the component 401 and thus of the vehicle may be carried out.

FIG. 5 shows a schematic view of the sinusoidal winding or, respectively, of the sinusoidal coil 315a of the receiving coil pair 315. The sinusoidal winding is preferably configured as a conductor on the carrier 303. Here, a "positive" sinusoidal conductor 503 and a "negative" sinusoidal conductor 501 are provided. The conductor 501 is preferably arranged in a first layer, the conductor 503 is preferably arranged in a second layer. Both conductors 501 and 503 are through-plated at a location 505 and are connected to each other. The connecting location 505 may also be referred to as through-hole.

The conductor 501 comprises a first winding end 507. The conductor 503 comprises a second winding end 509. At both winding ends 507 and 509, a differential voltage of the sinusoidal winding 315 is measured. The differential voltage may be referred to as $U_{ab}$, "a" indicating the first winding end 507 and "b" indicating the second winding end 509.

Preferably, the end "b", i.e. the second winding end 509, is connected to ground. Then, a voltage applied to "a" is measured against ground, as well, so that in this case a differential voltage $U_{ab}$ of the sinusoidal winding 315a is measured.

In the following, the measuring principle for a position detection of the component 401 during a shift of the component 401 along the position detection device 301 will be explained in more detail.

The energizing coils 311 and 313 of the two detecting modules 305 and 307 are fed with an alternating voltage, wherein an output voltage of the receiving coil pairs 315, 317, 319, 321 and 323, i.e. particularly of the sinusoidal and cosinusoidal windings is measured. The difference between the output voltages, e.g. $U_{ab}$, approximates 0 if the coil fields are not interfered with by electrically conductive objects, e.g. the electrically conductive areas of component 401. If a slide comprising the component 401 slides along the travel path and over the coils, a differential voltage is measured in the windings of the receiving coil pairs 315, 317, 319, 321, 323 and/or between the windings of the receiving coil pairs 315, 317, 319, 321, 323. By means of this differential voltage, it is possible to draw conclusions about the position of the component 401 and thus on the position of the slide. Due to the specific arrangement, the phase shift and the shape of the windings of the receiving coil pairs 315, 317, 319, 321, 323, a mathematical function for calculating the position may be used. The frequency of the alternating voltage feeding the energizing coils 311 and 313 is preferably in the region of 100 kHz to 10 MHz.

Figure 8:
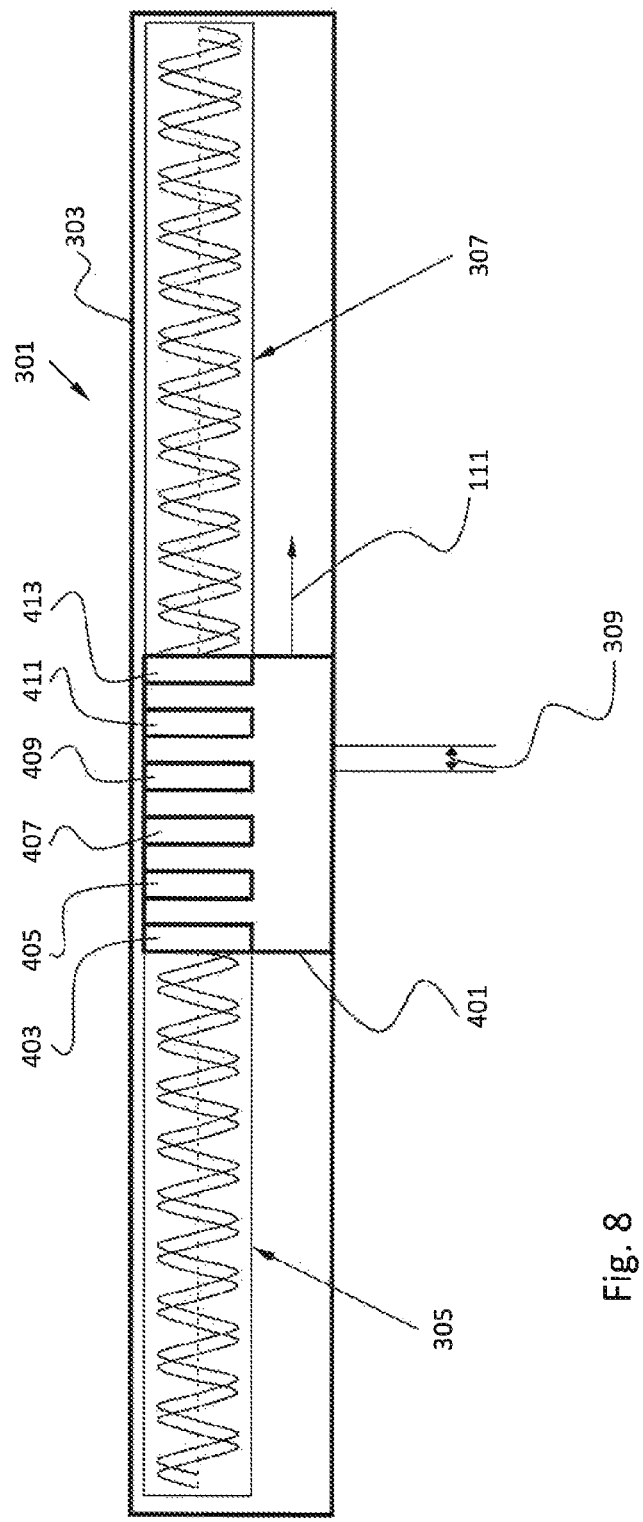

FIGS. 6 to 8 each show a shift of the component 401 according to FIG. 4 along the position detection device 301 of FIG. 3. In this context, the views of FIGS. 6 and 7 show a cut-off position detection device 301 for clarity reasons.

FIG. 6 shows a position of the component 401 relative to the position detection device 301 in such a way that only the electrically conductive areas 411 and 413 are opposite to the receiving coil pair 315. This particularly means that only the electrically conductive areas 411 and 413 interfere with the induced voltage of the cosinusoidal and sinusoidal windings 315a and 315b. Due to the width of half a period P of the electrically conductive areas as well as a distance of also half a period P, the two electrically conductive areas 411 and 413 either completely cover the positive or completely cover the negative part of the sinusoidal or, respectively, cosinusoidal windings, wherein this also applies for the other electrically conductive areas 403, 405, 407 and 409 in case of a corresponding coverage. This advantageously allows for a particularly good signal or, respectively, for a particularly good signal-to-noise ratio.

The position of component 401 shown in FIG. 6 and relative to the position detection device 301 shows the position at which a sufficiently good first position signal may be measured from the receiving coil pair 315.

FIG. 7 shows the last position of the component 401 relative to the position detection device 301 in which the windings 315a and 315b of the receiving coil pair 315 still output a position measuring signal, since here the two electrically conductive areas 403, 405 are still opposite to the corresponding windings and cause corresponding interfering. However, as soon as the electrically conductive areas 403 and 405 are no longer opposite to the windings of the receiving coil pair 315 due to the shift 111, the electrically conductive areas 403 and 405 no longer interfere with a corresponding magnetic field so that a position signal may no longer be output, either.

FIG. 8 shows the component 401 while being traversed or, respectively, shifted over the predefined distance 309 between the two detecting modules 305 and 307. Due to the fact that the component 401 has a length which is larger than the predefined distance 309, position signals from the detecting module 305 as well as from the detecting module 307 are output. In detail, the electrically conductive areas 411 and 413 already cover the corresponding windings of the detecting module 307, whereas the electrically conductive areas 403, 405 and 407 also cover windings of the detecting module 305 so that a change of a coil voltage may be measured in both detecting modules 305 and 307, so that corresponding position signals may be output on the basis thereof.

This advantageously allows for a continuous position detection, since corresponding position signals may either be output from the detecting module 305, from the detecting module 307 or from both detecting modules.

FIG. 9 shows an individual view of the sinusoidal winding 321a of the receiving coil pair 321. Here, the sinusoidal winding 321a comprises three periods P. A length L of the sinusoidal winding 321a thus amounts to three periods P.

FIG. 10 shows an enlarged view of a section of the two detecting modules 305 and 307. Reference numeral 601 indicates the position at which another position signal may be output by the receiving coil pair 323 since after this position, an interference of the induced coil voltage from the electrically conductive areas is too low or no longer exists for generating a sufficiently strong position signal.

Reference numeral 603 indicates the position at which a first position signal may be output in the detecting module 307 if the component with its electrical areas is shifted over the corresponding windings of the receiving coil pair 315.

A distance between these two positions 601 and 603 is here one third of the length L. The distance between the positions 601 and 602 as well as the predefined distance 309 as well as the respective distance of positions 601 and 602 with regard to the respective sides of the detecting modules 305 and 307 which are arranged opposite to each other in a predefined distance 309 are usually known so that the distances may be measured as a reference by means of the corresponding position signals.

Figure 11:
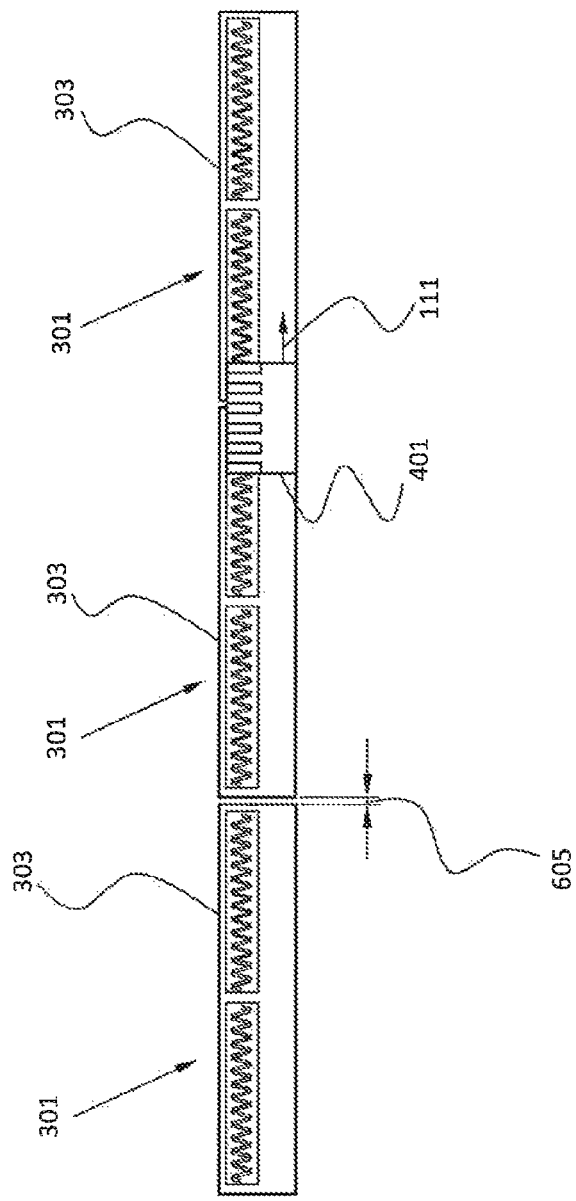
FIG. 11 shows a plurality of position detection devices arranged side-by-side.

FIG. 11 shows a shift of component 401 along a plurality of position detection devices 301 arranged side-by-side and being respectively arranged at a distance 605. This distance 605 is usually not known, however, it may be measured since during a shift of the component 401 from one position detection device 301 to the next, position signals of the corresponding detecting modules of the individual position detection devices 301 are measured, these position signals then being compared to the position signals which were measured during a shift of component 401 over the predefined distance 309 between two detecting modules of a position detection device 301.

FIG. 12 shows a further component 607 which is essentially configured in an analogous manner to component 401 of FIG. 4. As a difference, component 607 comprises a further electrical area 609 below the two electrically conductive areas 407 and 409. A width of the further electrical area 609 is indicated by means of a double-arrow having the reference numeral 609a, the width 609a preferably being 1.5 periods.

FIG. 13 shows another component 611 which is essentially configured in an analogous manner to component 607 of FIG. 12. Here, a further electrical area is formed below the two electrically conductive areas 407, 409, as well. This is indicated by reference numeral 613 in FIG. 13. A corresponding width is indicted by means of a double-arrow having the reference numeral 613a. The difference consists in that a width 613a of the further electrically conductive area 613 in this context preferably comprises two periods.

Said electrically conductive areas 609 and 613 of components 607 and 611 of FIGS. 12 and 13, which have differing configurations, allow for an unambiguous detection of components 607 and 611. This is explained in more detail in the following with reference to FIGS. 14 and 15.

FIGS. 14 and 15 show a shift of component 607 along a position detection device 301. The following explanations analogously apply to a shift of component 611.

The position detection device 301 is essentially configured in an analogous manner to the position detection device 301 of FIG. 3. The difference is that the position detection device 301 of FIGS. 14 and 15 comprises two further detecting modules 617a and 617b in a detecting area 615 which is formed below the two detecting modules 305 and 307.

The two further detecting modules 617a and 617b each extend below and along the two detecting modules 305 and 307. Both further detecting modules 617a and 617b are configured in the same manner so that only the further detecting module 617b is explained in more detail in the following.

The further detecting module 617b comprises three receiving coil pairs 619, 621 and 623. In an analogous manner with regard to the receiving coil pairs of the detecting modules 305 and 307, each of the receiving coil pairs 619, 621, 623 comprises a sinusoidal winding 619a or, respectively, 621a or, respectively, 623a as well as a cosinusoidal winding 619b or, respectively, 621b or, respectively, 623b. Furthermore, analogously to the two detecting modules 305 and 307, double-arrows and limitation lines are indicated in order to depict a top and end of the receiving coil pairs.

An energizing coil of the further detecting module 617b is charged with an alternating voltage so that an electric voltage is hereby induced in the individual windings of the further detecting module 617b. If the component 607 is shifted along the position detection device 301, the further electrically conductive area 609 will be opposite to the windings of the further detecting module 617a or, respectively, 617b and thus interfere with the respectively induced voltage in the windings. This interference may be determined by measuring the voltage, this interference particularly depending on the shape, particularly on the width 609a of the further electrical area 609.

This particularly means that the further electrically conductive area 609 of the component 607 causes a different interference than the further electrically conductive area 613 of component 611 of FIG. 13. This advantageously allows for distinguishing between the two components 607 and 611. Moreover, the components 607 and 611 may also be distinguished from such components which in analogy to component 401 of FIG. 4 do not comprise a further electrical area since these components only cause an interference in the detecting modules 305 and 307, but not in the further detecting modules 617a, 617b.

FIG. 16 shows the view of FIG. 14, wherein a graphic depiction of the position signal over a travel path (x) is additionally shown. In this context, the position signal of the abscissa is based on the measurement of the coil voltages in the individual windings of the two detecting modules 305 and 307.

Two straight lines with the reference numerals 625, 627 are shown, the straight line 625 corresponding to the corresponding progression of the position signal output by means of the detecting module 305. The trajectory or straight line having the reference numeral 627 corresponds to the progression of the position signal output by means of the receiving module 307. Due to the corresponding width of the component 607 as well as the correspondingly adapted gap or, respectively, the distance 309 between the two detecting modules 305 and 307, a position signal is output for each position x of the component 607. An overlapping area in which the detecting module 305 as well as the detecting module 307 outputs a corresponding position signal is indicted by means of a double-arrow having the reference numeral 629. A difference between the two trajectories 625 and 627 within the overlapping area 629 is indicated by means of two double-arrows having the reference numeral 631.

At the location or, respectively, position x at which the trajectory 625 starts, the electrically conductive area 413 has traversed the first winding of the detecting module 305. At position x at which the trajectory 625 ends, the electrically conductive area 403 has traversed the last winding of the detecting module 305. At position x, at which trajectory 627 starts, the electrically conductive area 413 has traversed a winding of the detecting module 307 for the first time. At position x at which trajectory 627 ends, the electrically conductive area 403 has traversed the last winding of the detecting module 307.

Here, the difference 631 between the two straight lines 625, 627 corresponds to the predefined distance 309 between the two detecting modules 305 and 307. Since said distance is usually known, a correlation between the values of position signals and the real distance 309 may thus be formed.

FIG. 17 shows a shift of the component 607 over the distance 605 between two position detection devices 301 as well as a progression of the corresponding position signals of the detecting module 307 of the position detection device 301 as well as of the detecting module 305 of the further position detection device 301. The straight line having the reference numeral 625 shows the progression of the position signal which was output by the left position detection device. The straight line having the reference numeral 627 shows the progression of the position signal which was output from the detecting module 305 of the right position detection device.

If the distance between the two position detection devices 301, i.e. distance 605, equals the predefined distance 309 between two detecting modules 305 and 307 of a position detection device 301, the corresponding trajectories 625, 627 are equal during the corresponding shifts between the corresponding distances. If, however, distance 605 deviates from distance 309, this causes differences in the corresponding trajectory progression or, respectively, the corresponding position signal progression.

Since, however, the predefined distance 309 was measured as a reference distance, the change or, respectively, deviation of the distance 605 may be compensated for by means of calculation. Particularly, it is advantageously possible to determine the distance 605 as an absolute distance.

Figure 18:
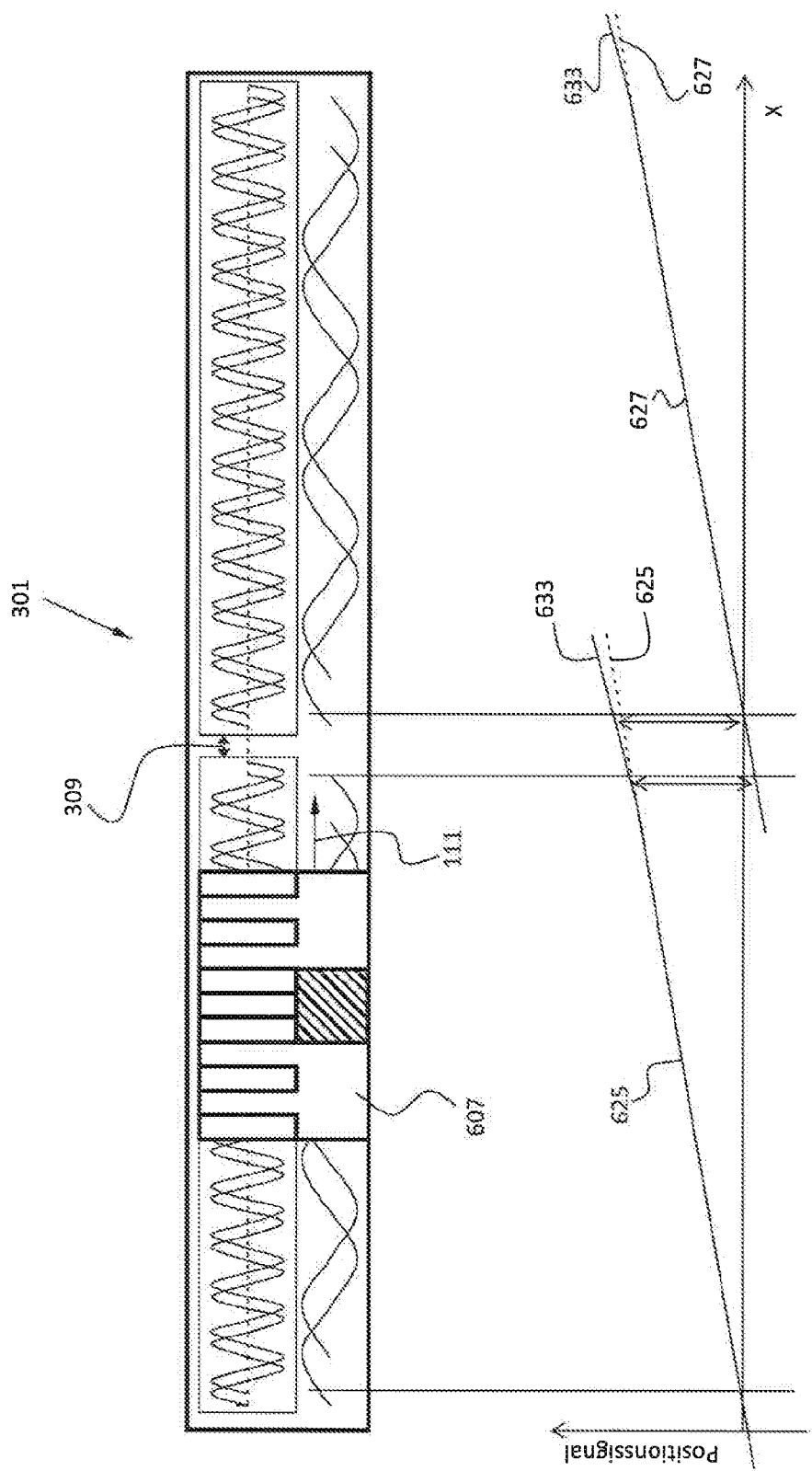
FIG. 18 shows a shift of the component of FIG. 12 along the position detection device of FIGS. 14 to 17, the component being tipped relative to the shifting direction, a graphic development of a position signal over the travel distance being shown in addition.

FIG. 18 shows a shift of component 607 along a position detection device 301 and corresponding graphic progressions of the position signals in analogy to FIGS. 16 and 17. Here, however, the component 607 is tipped relatively to the shift 111, i.e. relative to the travel path. This tipping, however, is not shown explicitly for clarity reasons.

Said tipping causes trajectory progressions 625, 627 differing from the ideal shape, i.e. the trajectory progressions of FIG. 16, wherein the trajectory area deviating from the ideal shape is indicated by reference numeral 633. The ideal shape or ideal progression of the position of the start of the deviation is indicated by means of a dashed line 625 or, respectively, a continuous line 627. This difference from the ideal shape may be recognized and compensated for by means of calculation, as well. This means that in case of a possible tipping of the component 607, this tipping may be recognized and considered during operation as soon as a predetermined distance has been measured as a reference.

Figure 19:
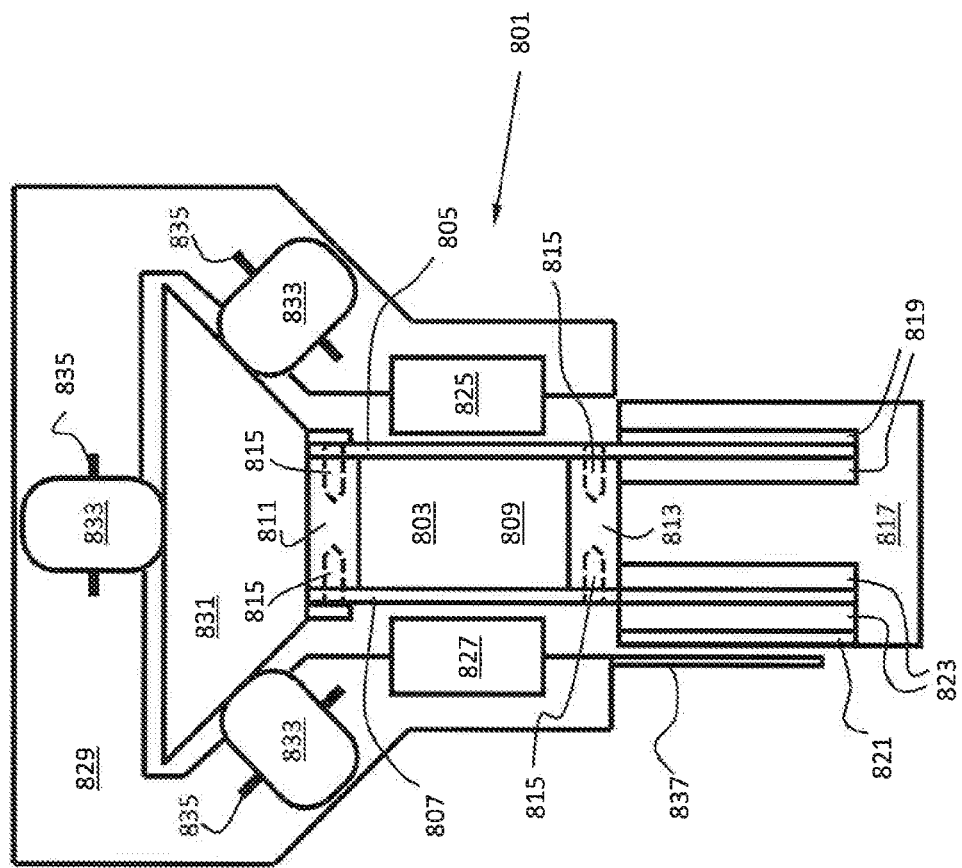
FIG. 19 depicts a linear transport system.

FIG. 19 shows a linear transport system 801 in a front sectional view. The linear transport system 801 comprises a stator device 803. The stator device 803 comprises a first printed circuit board 805 and a second printed circuit board 807 as a first or, respectively, second retaining unit of a retaining module which are arranged in parallel and opposite to each other.

An area between the two printed circuit boards 805 and 807 of the stator device 803 is indicated by reference numeral 809 and may be referred to as a coil area since a plurality of coils is arranged in said area. In this context, the coils are wound around stator teeth which are inserted into corresponding slots of the two printed circuit boards 805 and 807.

Above the coil area 809, a profile element 811 is formed as a receiving unit. Below the coil area 809, a profile element 813 is formed, as well, which extends in parallel to the profile element 811. The two profile elements 811 and 813 have a longitudinal extension analogue to the two printed circuit boards 805 and 807, so that the two printed circuit boards 805 and 807 may be fixed to the two profile elements 811 and 813 by means of screws 815. For this purpose, the two printed circuit boards 805 and 807 comprise corresponding holes. Both profile elements 811 and 813 advantageously support the two printed circuit boards 805 and 807 and advantageously particularly provide a mechanical stabilization of the stator device 803. Both profile elements 811 and 813 may thus also be referred to as supporting profile elements. Both profile elements 811 and 813 are particularly arranged with a sufficiently close distance to provide a thermal coupling between the coils and the profile elements 811 and 813 so that thermal energy generated during operation of the coils, i.e. particularly during energizing, may advantageously be dissipated in order to effectively prevent overheating of the coils. Both profile elements 811 and 813 may thus also be referred to as heat dissipation devices for dissipating thermal energy.

Below the profile element 813, a carrier profile element 817 is configured as a carrier module on which the profile element 813 is arranged or, respectively, fixed. This particularly means that the carrier profile element 817 carries the stator device 803. In an embodiment shown e.g. in FIG. 20, the profile element 813 and the carrier profile element 817 are configured as a shared profile element in modification of the linear transport system 801 of FIG. 19 and thus form the carrier module. The carrier profile element 817 may in particular comprise a cavity, also referred to as installation space, into which the two printed circuit boards 805 and 807 extend, wherein electronic components such as power electronics 819 and/or a carrier 821 of a position detection device may be arranged in said cavity or, respectively, installation space. The carrier 821 may preferably be configured analogously to the carriers 303 of FIG. 3 and FIG. 14.

The linear transport system 801 further comprises two permanent magnets which may also be referred to as permanent magnets 825 and 827. The two permanent magnets 825 and 827 are each arranged adjacently to the coil area 809. This particularly means that the permanent magnet 825 is located on the right-hand side of the printed circuit board 805. The permanent magnet 827 is located on the left-hand side of the printed circuit board 807. Here, the two permanent magnets 825 and 827 are arranged at a distance to the corresponding printed circuit boards 805 and 807. Thus, a respective gap is provided between the permanent magnets 825 and 827 and the printed circuit boards 805 and 807. Such an arrangement according to FIG. 8 may thus also be referred to as double-slit arrangement.

In an embodiment, a plurality of permanent magnets 825 and 827 may be provided which are each arranged on the left and on the right hand side of the corresponding printed circuit boards 805 and 807.

The permanent magnets 825 and 827 are respectively held by a bracket, a vehicle 829 being attached to the two brackets. Furthermore, a guideway 831 for the vehicle 829 is arranged on the profile element 811, i.e. on the receiving unit which is located above the coil area 809.

The guideway 831 has a trapezoid shape, a track roller 833 comprising a corresponding trailer axle 835 abutting at three sides of the trapezoid, respectively. The track rollers 833 are arranged at the vehicle 829, thus allowing for a rolling movement of the vehicle 829 along the guideway 831. The configuration of the track rollers 833 in their orientation, arrangement, geometry and number may be carried out in any desired variation without limitation and in other embodiments not shown herein.

In an embodiment, it may additionally or alternatively be provided that the vehicle is guided along the guideway 831 with a magnetic mount and/or a fluid mount, particularly a gas mount and preferably an air mount.

At the bracket holding the permanent magnet 827, a component 837 comprising electrically conductive areas is arranged. The component 837 may preferably be configured analogously to the components 401, 607, 611 of FIG. 4, FIG. 12 and FIG. 13. The component 837 runs to the bottom and away from the vehicle 829 in the direction of the carrier profile element 817 in an elongating manner and is thus arranged opposite to the carrier 821. From the measured position signals, a position may be calculated preferably at a different location, e.g. by means of a superordinate control. The reference numeral 823 indicates further electronic components arranged in the installation space which may e.g. be used for an electrical contacting of the detecting modules of the carrier 821.

Figure 20:
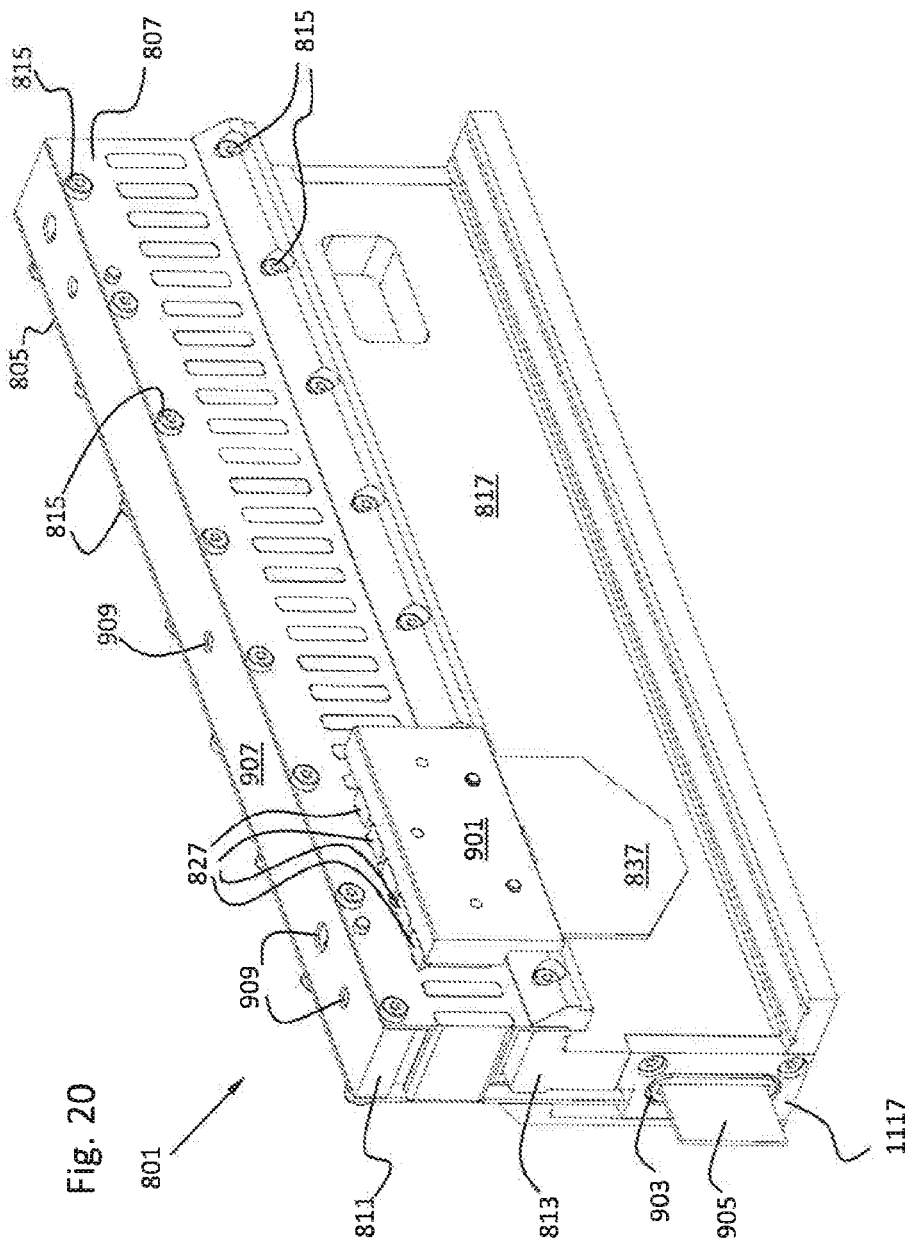
FIG. 20 shows a view of a variation of the linear transport system of FIG. 19.

FIG. 20 shows a slanted top view of the variation of the linear transport system 801 of FIG. 19, the vehicle 829 and the guideway 831 in accordance with the previous embodiments. FIG. 20 shows a bracket 901 which holds a plurality of permanent magnets 827. The component 837 is shown in more detail, as well.

FIG. 20 further shows the possibility of the carrier module being formed from the profile element 813 and the carrier profile element 817 as a shared profile element. A cap element 1117 comprises an opening 903 into which a contacting board 905 may be inserted. By means of said contacting board 905, an electrical contacting of the printed circuit boards 805 and/or 807 is allowed for.

Figure 21:
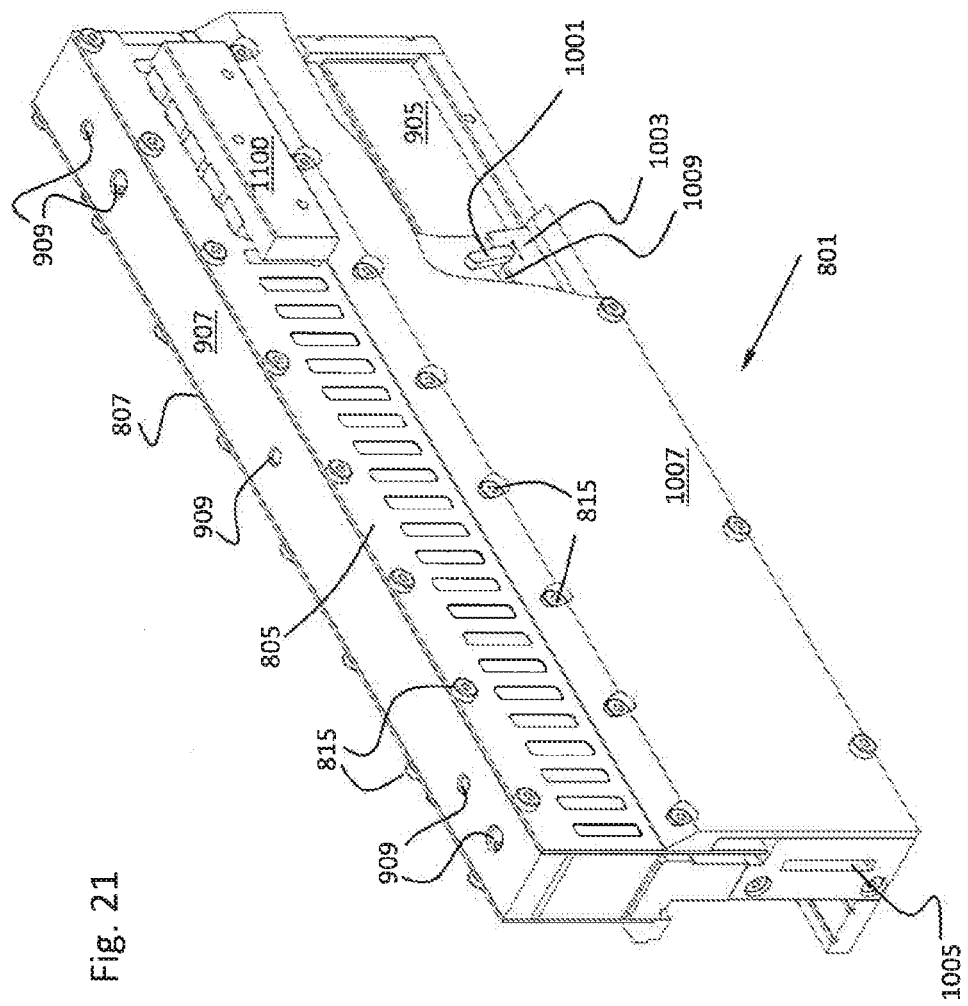
FIG. 21 shows a further view of the linear transport system of FIG. 20.

FIG. 21 shows a slanted view according to a back view referring to the view of FIG. 20 of the linear transport system 801. At a longitudinal end which is opposite to the longitudinal end comprising the opening 903, a further opening 1005 is provided into which a further contacting board of a preceding further linear transport system may be inserted. Thus, an electric connection to a further linear transport system is advantageously allowed for which may be configured analogously to the linear transport system 801. Thus, a modular system may advantageously be formed, wherein the individual modules may be formed of the linear transport systems 801. Here, it may preferably be provided that the guideway 831 is arranged above a plurality of such transport systems 801 so that butt joints between the individual transport systems 801 may be eliminated which positively influences smooth running of the vehicle.

The opening 903 and the further opening 1005 are connected to each other by means of a passage so that a tunnel runs through the carrier profile element 817. Since an electronic component may be inserted into such a tunnel, here e.g. the contacting board 905, such a tunnel may also be referred to as an installation space for an electronic component. In an embodiment, it may be provided that a rail is configured in the tunnel for guiding the contacting board 905.

FIG. 21 further shows a shifting means 1001 which interacts with the contacting board 905 in such a way that the contacting board 905 shifts longitudinally. This shift is symbolically indicated herein by means of a double-arrow having the reference numeral 1003. In order to be able to see the shifting element 1001, a cover plate 1007 fixed in a removable manner is for clarity reasons shown symbolically in a cut-open view.

Furthermore, reference numeral 1009 indicates a slit formed in a wall of a tunnel, the shifting means 1001 being inserted into the slit 1009 so that the shifting means 1001 may be shifted to and fro in the slit 1009.

Such a contacting board particularly comprises the following effect or, respectively, function. Two linear transport systems may in this manner be fixed to a retaining profile or, respectively, carrier board in a longitudinal side-by-side arrangement, wherein by shifting the plate or, respectively, the contacting plate 905 from one system to the next the adjacent system is automatically contacted. This particularly means that two linear transport systems may be contacted by means of a plate 905. Behind the opening 1005, e.g. a plug consisting of a plurality of spring contacts is located so that the inserted plate 905 is held in the position and contacted. This particularly provides the advantage that the individual modules or, respectively, transport systems may be dismantled laterally for maintenance without the necessity of shifting the modules apart. Furthermore, the entire system comprising the two or even further linear transport systems then only requires one connection for voltage supply and/or for connecting to a superordinate control.

FIGS. 20 and 21 further show a surface 907 of the profile element 811, the surface 907 comprising a plurality of recesses 909 into which screws and/or grooves and/or aligning pins may be inserted or, respectively, screwed in order to fix the guideway 831 to the profile element 811, i.e. the receiving unit.

Figure 22:
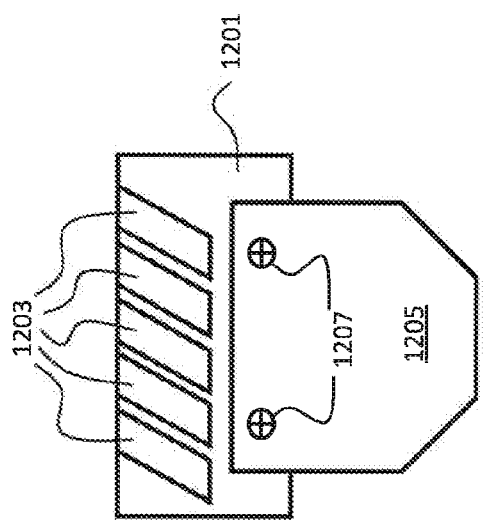
FIG. 22 depicts a further component.

FIG. 22 shows a bracket 1201 comprising a plurality of trapezoid permanent magnets 1203. The bracket 1201 may preferably be referred to as a magnetic bracket.

Below the permanent magnets 1203, a component 1205 comprising electrically conductive areas is arranged, which is screwed to the bracket 1201 by means of screws 1207. The component 1205 is preferably configured analogously to the components 401, 607, 611 according to FIG. 4, FIG. 12 and FIG. 13.

Such a bracket 1201 may particularly be used by the linear transport system 801. A vehicle may then preferably be fixed to the bracket 1201.

Compared to permanent magnets with rectangular shape, the trapezoid shape of the permanent magnets 1203 has the advantageous effect of minor force-induced ripples, which advantageously leads to a more smooth movement or, respectively, shift of the bracket 1201.

In FIG. 21, the reference numeral 1100 refers to an alternative embodiment of the bracket which is formed analogously to the bracket 1201 of FIG. 22, however, without the component 1205.

Figure 23:
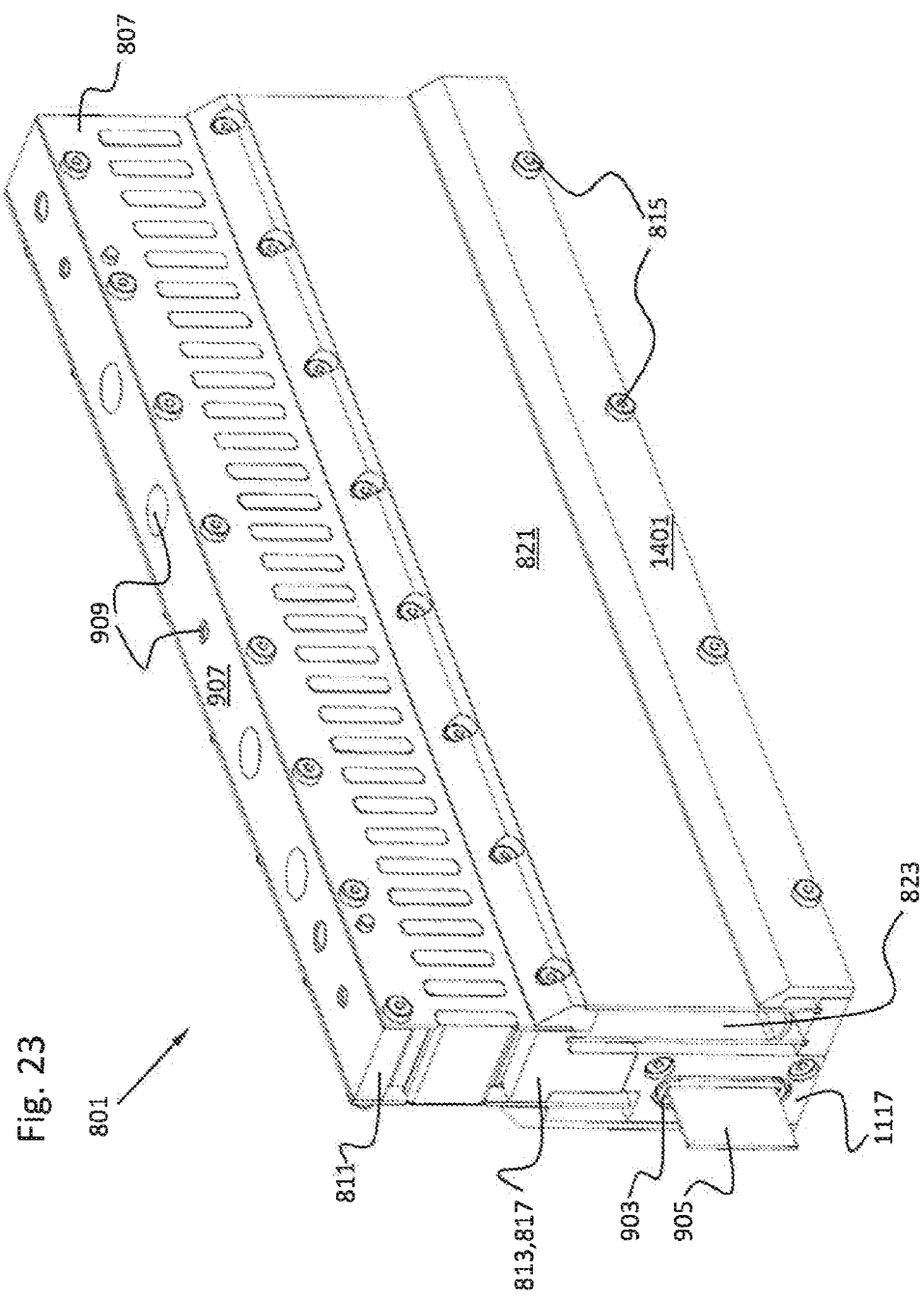
FIG. 23 shows a further view of the linear transport system of FIG. 20.

FIG. 23 shows a slanted view onto the linear transport system 801 according to FIGS. 19 to 21, wherein for the purpose of clarity neither the vehicle 829, nor the guideway 831, nor the bracket 901 are shown. The linear transport system of FIG. 23 essentially corresponds to the linear transport system shown in FIG. 20 so that the substantiations made with regard to FIG. 20 analogously apply for FIG. 23, as well.

Contrary to the depiction in FIG. 20, FIG. 23 shows the carrier 821 which is fixed to the carrier profile element 817 in a detachable manner by the retaining element 1401 by means of screws 815.

Figure 24:
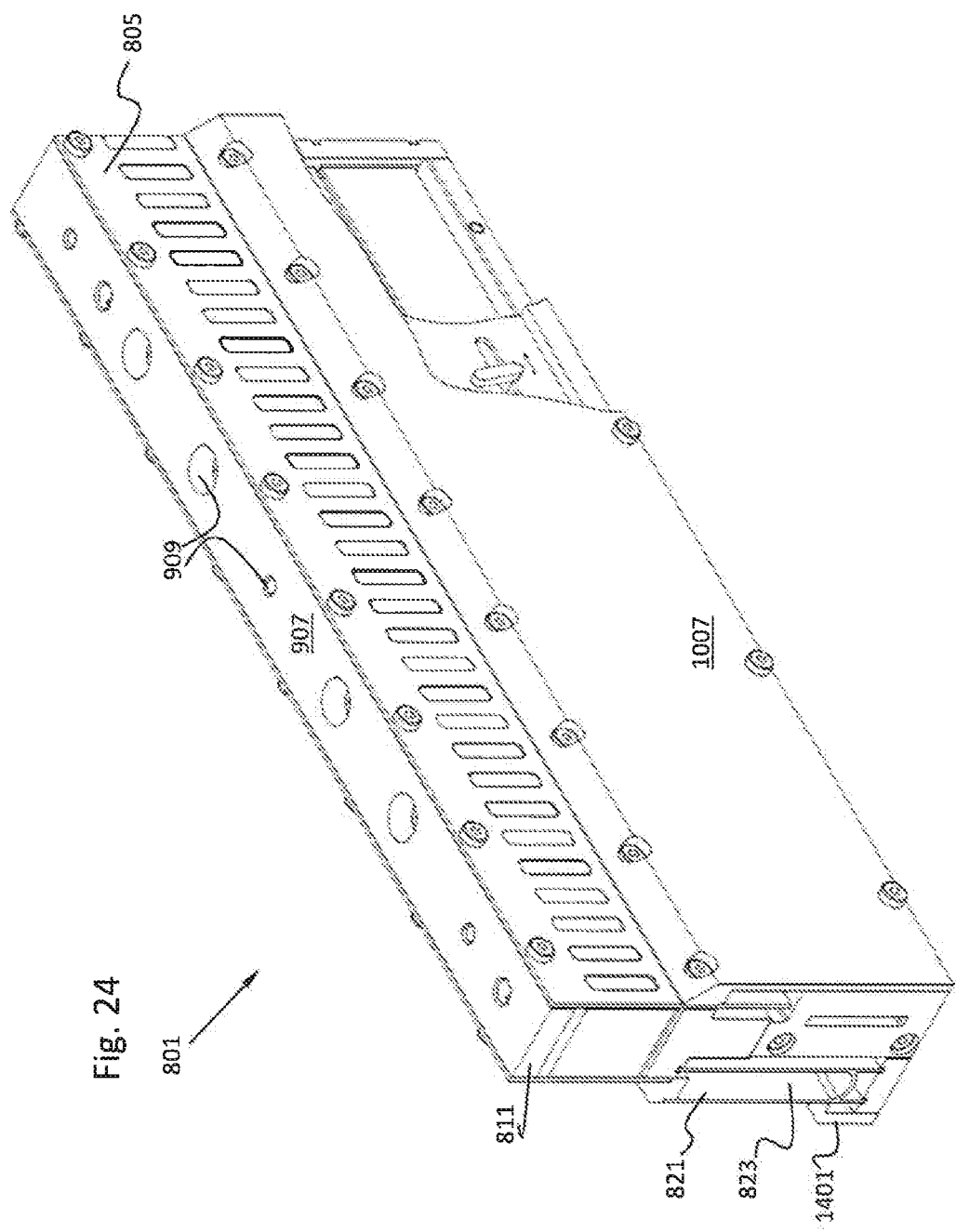
FIG. 24 shows a further view of the linear transport system of FIG. 23.

FIG. 24 shows a slanted top view corresponding to a back view referring to the view of FIG. 23 of the linear transport system 801. The substantiations made with regard to FIGS. 20, 21 and 23 concerning the linear transport system 801 analogously apply for FIG. 24 so that reference is made to the above explanation in order to avoid repetitions.

Figure 25:
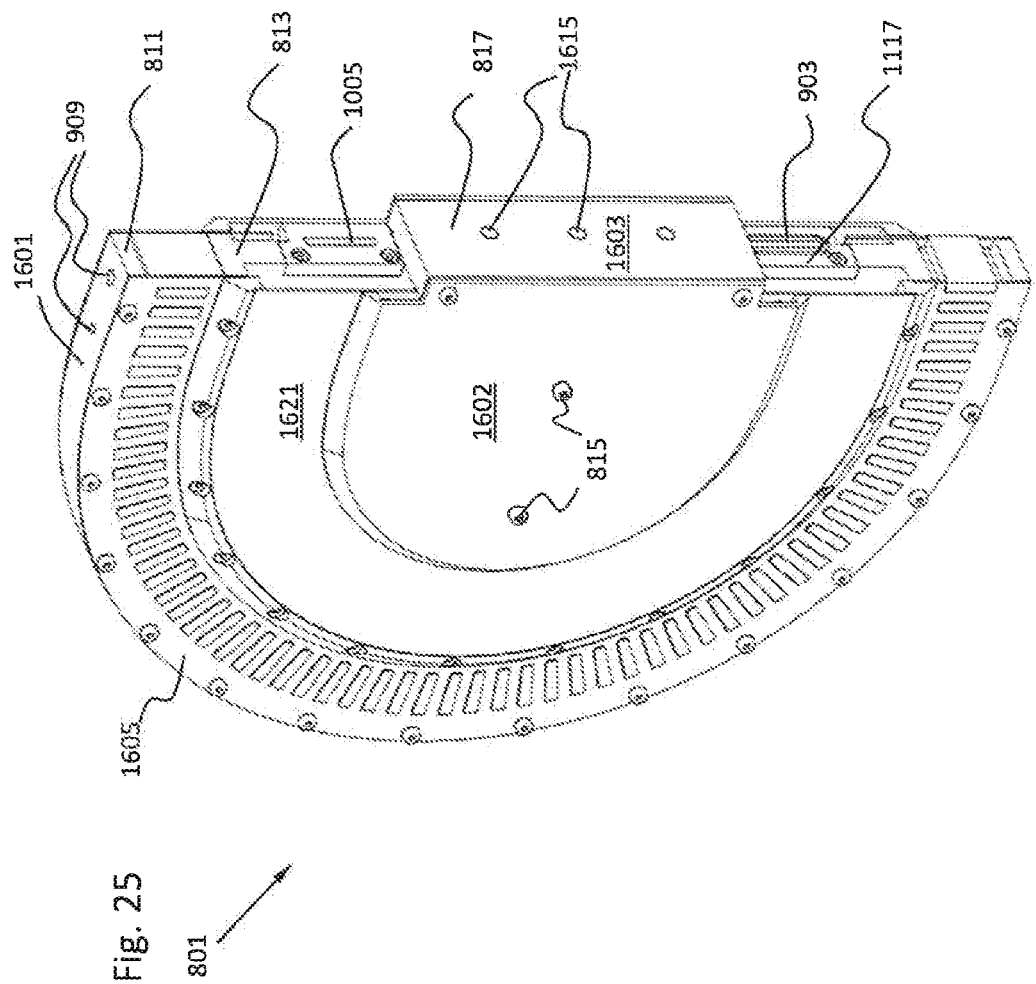
FIG. 25 depicts a view of an arc-shaped linear transport system.

FIG. 25 shows an arc-shaped linear transport system 801 according to FIGS. 19 to 21 and 23 to 24 in a slanted top view, wherein here as well neither the vehicle 829, nor the guideway 831, nor the bracket 901 are shown for clarity reasons. The printed circuit board 1605 in its functional extent corresponds to the printed circuit board 805 of FIG. 19, expect for being arc-shaped.

The surface 1601 of the arc-shaped profile element 811 also comprises a plurality of recesses 909 into which screws and/or grooves and/or aligning pins may be inserted or, respectively, screwed in order to fix the guideway 831 to the profile element 811, i.e. to the receiving unit.

Furthermore, according to FIG. 25, the linear transport system 801 comprises a printed circuit board 1621 as a carrier of the position detection device, the configuration of which corresponds to the above-depicted and -described carrier 821 which is preferably configured as a printed circuit board. The printed circuit board 1621 is fixed to the carrier profile element 817 in a detachable manner by a retaining element 1602 by means of screws 815.

Figure 26:
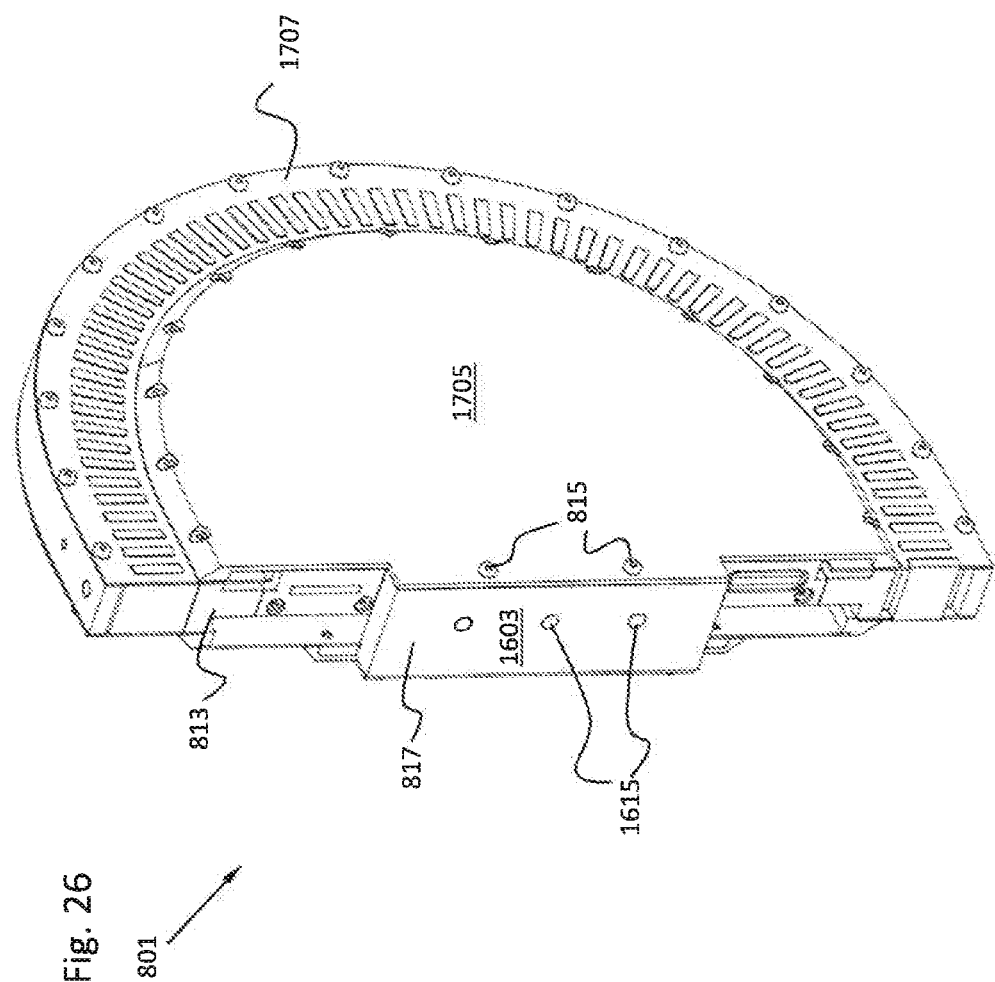
FIG. 26 shows a further view of the arc-shaped linear transport system of FIG. 25.

FIG. 26 shows a slanted top view corresponding to a back view referring to the view of FIG. 25 of the linear transport system 801. The substantiations made in conjunction with FIGS. 20, 21, 23, 24 and 25 with regard to the linear transport system 801 analogously apply for FIG. 26 so that reference is made to these explanations in order to avoid repetitions.

The printed circuit board 1707 in its functional extent corresponds to the printed circuit board 807 of FIG. 19, except for being arc-shaped. The cover plate fixed in a detachable manner by means of screws 815 in its configuration and functionality corresponds to the cover plate 1007 shown in FIG. 21.

The carrier profile element 817 of the arc-shaped linear transport system 801 shown in FIGS. 25 and 26 comprises a ledge 1603 comprising fixing bores 1615 by means of which the linear transport system may be fixed to a machine frame in a detachable manner.

Above and below the ledge 1603, e.g. straight linear transport systems 801 according to FIG. 20, 21, 23 or 24 may be attached to the arc-shaped linear transport system 801 according to FIG. 25 or 26. For this purpose, the straight linear transport systems 801 are fixed to the machine frame in a detachable manner, as well. Subsequently, the shiftable plates 905 are shifted from openings 903 into openings 1005 so that the individual modules of the linear transport system 801 are electrically connected to one another. On the surfaces 907 and 1601 of the profile element 811, correspondingly configured guideways 831 are set up and fixed by means of the openings 909 in a well-known manner. Here, the guideway 831 may also cover a plurality of individual linear transport systems 801. The correspondingly configured vehicles 829 are then set up on the guideways 831 and driven as described above.

If it becomes necessary to exchange one single linear transport system 801 in an entire system consisting of a plurality of straight and/or arc-shaped linear transport systems 801, the connection to the guideway 831 should at first be released. Subsequently, the shiftable plate 905 should be shifted back into the adjacent linear transport system 801 and the shiftable plate 905 located in the linear transport system 801 to be exchanged should be drawn back from the other adjacent linear transport system 801. In a last disassembly step, the fixing to the machine frame should be released; the linear transport system 801 to be exchanged may then be removed. A new linear transport system 801 may then be integrated into the entire system in reverse order. An advantage of such a modular configuration may particularly be seen in that only the linear transport system to be exchanged has to be released from the guideway 831 and the machine frame and that it is not necessary to disassemble the linear transport systems 801 remaining in the entire system. In the case of maintenance, this allows for substantial advantages in saving time and costs when compared to transport systems known from the state of the art.

According to an aspect, a position detection device for detecting a position of a movable element in a drive device is provided. The position detection device comprises a carrier, the carrier comprising two detecting modules for detecting a position of the movable element, said detecting modules being arranged side-by-side at a predetermined distance and without overlapping. The detecting modules are further configured to output a position signal when detecting the movable element. This particularly means that each of the two detecting modules outputs a corresponding position signal when detecting the movable element. If the movable element is shifted along the two detecting modules over the predetermined distance, the predetermined distance may be thus measured as a reference distance on the basis of the position signals.

According to another aspect, a method for detecting a position of a movable element in a drive device is provided by means of the above-mentioned position detection device. Here, the movable element is shifted along the two detecting modules over the predetermined distance. Moreover, the respective position signals of the two detecting modules are measured during the shift. The predetermined distance is measured as reference distance on the basis of the position signals.

According to a further aspect, a computer program is provided which comprises a program code for carrying out the above-mentioned method if the computer program is executed on a computer.

In general, a predetermined distance between two detecting modules is measured as a reference. For the purpose of this measurement, the respective position signals are used which are output by means of the two detecting modules if these detect the movable element when it is shifted. Thus, a correlation between the position signals, particularly between processed position signals, and the predefined distance may be carried out in an advantageous manner. Since this predetermined distance is known, a reference distance may be defined or, respectively, determined by this measurement.

If e.g. two such carriers are provided, as defined in the independent claims, which are arranged side-by-side along a travel path of the movable element, a distance between the two carriers is usually provided. For structural reasons, this distance is generally unknown or, respectively, changes during operation. The distance may e.g. change due to temperature fluctuations. Furthermore, installation tolerances may be responsible for the fact that a distance between two carriers is not always the same.

If the movable element is shifted along the first carrier, the corresponding detecting modules of the first carrier provide position signals. If the movable element then moves on to the second carrier, the second carrier will output position signals by means of its corresponding detecting modules, as well. Thus, position signals of the first carrier and position signals of the second carrier are available for detecting the position. Since a distance is provided between the two carriers, the distance will influence the position signals.

If the distance between the two carriers e.g. equals the predetermined distance between the two detecting modules of a carrier, there will usually be no possibility of determining a difference between the corresponding position signals.

If, however, the distances differ from each other, the result is a deviation of the position signals. However, since according to the invention a correlation between a distance and a position signal was carried out by measuring the predetermined distance, which e.g. means that the position signals have been calibrated, conclusions may be drawn with regard to the unknown distance on the basis of the position signals of both carriers. Changes in the distance between two carriers may be mathematically compensated due to the reference measurement of the predetermined distance between two detecting modules of a carrier so that a current position of the movable element may be determined at any time. In particular, an absolute value of a distance between two carriers may further be determined due to this reference measurement in an advantageous manner.

As a result, in particular a comparison between position signals is carried out which on the one hand were measured during a shift of the movable element from one carrier to the next carrier and on the other hand during the shift of the movable element between two detecting modules of a carrier.

According to an embodiment, it may be provided that the carrier has a square shape. This advantageously allows for simple manufacturing of the carrier. Furthermore, a simple successive assembly of a plurality of carriers is advantageously allowed. This is particularly true when comparing the inventive system to known systems of carriers which have a stepped configuration.

According to a further embodiment, the carrier may be configured as a printed circuit board. A printed circuit board within the meaning of the present invention is particularly a carrier for electronic components. A printed circuit board within the meaning of the present invention is particularly configured to mechanically fix electronic components and to electrically connect them or, respectively, contact them. A printed circuit board within the meaning of the present invention may particularly be configured as a circuit card, a plate or a printed circuit. A printed circuit board within the meaning of the present invention particularly comprises an electrically insulating material having electrically conductive connections which may preferably be arranged—preferably in an adhesive manner—at the electrically insulating material. Said electrically conductive connections may preferably be referred to as conductors. Preferably, the printed circuit board comprises a plastic material, particularly a fibre-reinforced plastic material, as an electrically insulating material. By providing a fibre-reinforced plastic material, a particularly high mechanical stability of the printed circuit board is advantageously achieved in at least one preferred direction, particularly in a plurality of preferred directions. It may preferably be provided that the conductors, i.e. the electrically conductive connections, are embedded in the electrically insulating material. Thus, the electric conductors are protected against external influences in an advantageous manner. Particularly, this reduces the hazard of an electric short-circuit in an advantageous manner, or even prevents it insofar as the electric conductors are on the one hand insulated from each other and on the other hand from further electrically conductive components by means of the electrically insulating material.

In a further embodiment, it may be provided that the carrier comprises a detecting area adjacent to the detecting modules and extending alongside the first detecting module over the predetermined distance up to the second detecting module, a further detecting module for detecting a position of the movable element being arranged in said detecting area, the further detecting module being configured to output a position signal when detecting the movable element.

The carrier comprises a third detecting module, i.e. the further detecting module, so that a redundancy is advantageously provided with regard to position detection. In the case of failure of the detecting module or of the two detecting modules, position detection is still possible by means of the further detecting module. Furthermore, a distinction of a plurality of movable elements is advantageously possible as detailed in the following. Here, movable elements are provided which comprise dimensions and/or materials in such a way that they are located outside of the detecting area of the further detecting module during the shift or, respectively, may not be detected by the further detecting module due to the materials. Furthermore, movable elements are provided which comprise dimensions and/or materials in such a way that during the shift they are located in the detecting area of the further detecting module in addition to a respective detecting area of the first detecting module and of the second detecting module, or, respectively, that they may be detected by the further detecting module due to the used materials. Said latter movable elements thus cause all three detecting modules to output position signals. Movable elements which may only be detected by the first and the second detecting module but not by the further detecting module, as well, particularly cause only the two detecting modules to output a position signal, not, however, the further detecting module. Thus, a distinction may be made between different movable elements in an advantageous manner.

According to another embodiment, it may be provided that the detecting modules each comprise an energizing coil and a receiving coil assigned to the energizing coil, the receiving coil having a geometry comprising one period. This particularly means that the first detecting module as well as the second detecting module as well as the further detecting module may comprise the above-mentioned field and receiving coils. Particularly, a plurality of receiving coils may be provided, each of which is assigned to an energizing coil. The receiving coils may preferably be configured equally or differently.

Thus, it is particularly possible in an advantageous manner to charge the energizing coil with an electric energizing impulse, preferably a voltage impulse. Said energizing impulse induces an electric voltage within the receiving coil. This induced receiving coil voltage may be measured, i.e. the electric voltage applied to the receiving coil is measured. Based on the measured receiving coil voltage, the position of the movable element may be determined in an advantageous manner. If the movable element moves over the receiving coil, this will for example change a maximum value of the time response of the coil voltage within the receiving coil. This change which becomes particularly obvious by measuring the induced coil voltage is used for determining the position of the movable element. If no movable element moves over the receiving coil, the electromagnetic coupling between the energizing coil and the receiving coil is not interfered with and the induced coil voltages are neutralized so that the measured receiving coil voltage becomes 0.

According to an embodiment, a differential voltage of the receiving coil is measured. A coil within the meaning of the present invention particularly comprises a coil top and a coil end, the differential voltage being particularly measured between the coil top and the coil end. A coil, i.e. an energizing coil and/or a receiving coil, preferably comprises n windings, n representing the number of windings. In a further embodiment of the present invention, the coil end or the coil top is connected to ground; here, a voltage between the coil top or, respectively, the coil end is particularly measured which corresponds to a differential voltage of the coil. By means of the measured differential voltage it is particularly possible to deduct the position of the movable element. In order to do so, e.g. a mathematical function for calculating the position based on the measured differential voltage is used.

According to an embodiment, the receiving coil has a sinusoidal or cosinusoidal geometry. The receiving coil may particularly comprise a triangular geometry. Such a geometry particularly means that the maximum value of the induced voltage which imaged in the receiving coil has a cosinusoidal or, respectively, sinusoidal or triangular time response over the position of the movable element. Such geometries may particularly be realized by means of a corresponding winding arrangement. If a plurality of receiving coils is provided, these may e.g. have sinusoidal or, respectively, cosinusoidal geometries which are particularly arranged with a 90° shift with regard to each other. This means that a phase difference of the respectively induced coil voltage is 90°. Preferably, such a phase shift may also differ from 90°.

Preferably, in the case of a sinusoidal or, respectively, cosinusoidal geometry, the number of sinusoidal waves or, respectively, cosinusoidal waves is at least one, particularly two, preferably three. This advantageously allows for a simple coil winding. In spite of this, a good signal-to-noise ratio is furthermore provided.

An energizing impulse within the meaning of the present invention particularly comprises a limited time duration. The time duration is preferably in the microsecond range. Preferably, a time duration of the electric energizing impulse may be less than 1000 µs, particularly less than 100 µs and particularly less than 10 µs. The shorter the electric energizing impulse, the shorter is a time duration of the induced coil voltage in the receiving coil. Furthermore, an electromagnetic interference in an adjacent energizing coil or receiving coil may thus particularly be prevented in an advantageous manner. Thereby, a position detection may be carried out in a particularly sensitive manner.

According to an embodiment, the energizing coil may be charged with a plurality of electric energizing impulses. Thus, it is possible in an advantageous manner to carry out several successive position measurements. A travel path of the movable element may thus be observed in an advantageous manner. In general, an electric energizing impulse may also be referred to as an electrically pulsed energizing signal. A time distance between two electric energizing impulses or, respectively, between two pulsed energizing signals may e.g. be 20 µs. Preferably, the electric energizing impulses are charged with a repeat frequency of 1 kHz to 1 MHz. A time duration of the energizing impulse may particularly be between 600 ns and 2000 ns, the energizing impulse preferably having a time duration of approximately 600 ns or approximately 2000 ns.

According to an embodiment, a plurality of receiving coils, particularly two, e.g. four, preferably eight receiving coils, may be assigned to an energizing coil. According to a further embodiment of the present invention, a plurality of energizing coils, particularly two, e.g. three, particularly four energizing coils may be provided. In particular the provision of a plurality of receiving coils advantageously allows for a particularly precise position detection of the movable element since the relative position of the movable element with regard to the receiving coils may be determined by means of a corresponding mathematical evaluation of the measured differential voltages. If a plurality of receiving coils is provided, a differential voltage may preferably be measured with regard to a receiving coil. In addition or instead, a differential voltage between two receiving coils may particularly be measured. This particularly means that a differential voltage of one receiving coil and a differential voltage of the other receiving coil is measured, these two measured differential voltages being preferably offset against each other by means of a mathematical function. Based on the measured differential voltages, the position of the movable element in the drive device may advantageously be determined.

For example, a differential voltage or, respectively, a difference between two measured differential voltages may be approximately 0 V. This is particularly the case if the electromagnetic fields of the receiving coils are not interfered with by the presence of the movable element, which is particularly the case if the movable element is not in the proximity of the receiving coils, e.g. over the receiving coils. A differential voltage or, respectively, a difference between two measured differential voltages is particularly not 0 V, i.e. does not equal 0 V, if the movable element interferes with the electro-magnetic fields in the receiving coils. Such an interference particularly results if the moving element is in the proximity of the receiving coils, e.g. over the receiving coils. Due to the specific coil arrangement, the phase shift and the shape of the receiving coils, a mathematical function may particularly be used in order to calculate the position.

According to an embodiment, the receiving coils may be assigned to the energizing coil in pairs. They thus form receiving coil pairs. In this case, a differential voltage is measured for each receiving coil pair. It is thus advantageously possible to continuously measure the position of the movable element even over an extended travel distance or, respectively, stretch of way.

A position within the meaning of the present invention may particularly be a position in a coordinate system, particularly in a Cartesian coordinate system. A position of the movable element may thus be described by means of an X, Y and/or Z coordinate. Preferably, a position of the movable element may also be described by means of spherical coordinates. Particularly if the movable element is a rotating movable element, a position may also comprise an angle of rotation. This particularly means that an angle of rotation of the rotating element is determined.

According to an embodiment, the energizing coil and/or one or a plurality of receiving coil(s) may be formed as one or a plurality of conductors on a plate or, respectively, a printed circuit board. This particularly means that on a plate, conductors are configured in such a way that they form a coil. By providing such a plate, a particularly simple electric contacting of the coils is thus made possible. Preferably, such a printed circuit board is identical to the carrier. As a result, this particularly means that the carrier is configured as a printed circuit board or, respectively, a plate, the coils being configured as conductors of the printed circuit board.

According to an embodiment, the energizing coil has a square shape, the receiving coil or, respectively, the receiving coils being preferably rectangularly arranged. In general, a winding of the energizing coil may also be referred to as an energizing winding. In general, a winding of the receiving coil may also be referred to as a receiving winding.

According to an embodiment, the measured receiving coil voltage is immediately sampled and immediately digitalized for digital processing. Thus, an analogous demodulation by means of the energizing signal is advantageously no longer necessary. In this manner, sampling frequencies of several kHz, e.g. 50 kHz, may particularly be achieved. In the known state of the art, the measured analogous voltage signal is used for a cross correlation with the analogous energizing voltage signal. Only the analogous signal resulting from the cross correlation procedure is digitalized. Contrary thereto, however, in this preferred embodiment of the present invention the measured receiving coil voltages are directly digitalized and processed only then, which allows for position calculation with considerably increased speed. Thus, prior to a potential processing, a sampling and digitalizing of the raw data, i.e. the measured receiving coil voltages, is first carried out.

In another embodiment, the detecting modules may each comprise a plurality of receiving coils arranged side-by-side. Thereby, an even more precise position detection of the movable element is advantageously possible to the extent that a statement may be made on where exactly the movable element is located relative to the detecting module. For this purpose, the receiving coils are each preferably evaluated individually.

In another embodiment, a width of the energizing coil may be at least 2.5 periods. Thus, receiving coils with at least two sinusoidal waves or, respectively, cosinusoidal waves may advantageously be provided, i.e. waves having a length of 2 periods, thus resulting in a good signal-to-noise ratio.

In an embodiment, the movable element comprises at least a component with electrically conductive areas for electro-magnetically interfering with the electro-magnetic field induced in the receiving coil or, respectively, the receiving coils. This particularly means that in an embodiment the position detection device comprises the movable element. The electrically conductive areas may preferably be configured in the same or in a different manner.

The mentioned interference is particularly visible in the measured receiving coil voltage so that the presence of the movable element may be determined in the area of the receiving coil. If such an interference signal is not present, the conclusion may be drawn that no movable element is located in the area of the receiving coil.

The component may preferably be configured as a body, particularly a rectangular body, particularly as a plate or, respectively, a printed circuit board. An electrically conductive area is preferably formed of an electrically conductive material. This particularly means that the component comprises an area which is formed of an electrically conductive material. Preferably, an electrically conductive area is formed by means of metallization of a surface of the component. This particularly means that the component comprises surface areas which are metalized. An interference signal is particularly dependent on a number of electrically conductive areas so that differences with regard thereto result in differing interference signals which in turn leads to differing induced coil voltages. Thus, a concrete component may be assigned to a correspondingly measured coil signal, thus advantageously allowing for an identification of the movable element. Since this has the effect of an attenuation of the induced coil voltages due to the component, said component may preferably be referred to as damper plate.

In another embodiment, the electrically conductive areas of the component may each have a width of half a period, a respective distance between two areas preferably being half a period. This advantageously has the effect that the electrically conductive areas may completely cover the positive or the negative part of the sinusoidal waves or, respectively, the cosinusoidal waves. This results in a particularly good signal-to-noise ratio.

According to yet another embodiment, a further electrically conductive area may be formed which is arranged below the electrically conductive areas and opposite to the further detecting area. Thereby, the further electrically conductive area may advantageously be detected by the further detecting module insofar as the further electrically conductive area causes an interference signal in the induced voltage of the receiving coil of the further detecting module. The substantiations given in connection with the electrical areas apply analogously to the further electrical area.

According to another embodiment, a length of the movable element, particularly of the component, may be larger than the predefined distance. This allows for advantageously and continuously measuring position signals since the movable element is either detected by the first detecting module, the second detecting module or by both detecting modules.

According to yet another embodiment, an orientation of the movable element, particularly of the component, may be determined on the basis of the position signal relative to a shifting direction. Thus, it may advantageously be determined whether the movable element or, respectively, the component is e.g. tipped. The orientation determined in such a way may advantageously be used for further calculations and control commands based thereon.

In a further embodiment, the drive device comprises a linear motor which may shift the movable element. In such a case, in particular a linear position of the movable element is determined. The movable element is preferably formed as a slide or, respectively, a vehicle which may be shifted by means of the linear motor. In particular, one or several components are arranged at the slide for the purpose of position detection. Such a drive device may also be referred to as a linear transport system.

Preferably, a plurality of slides is provided which may be shifted by means of the linear motor. A plurality of linear motors may particularly be provided. Each of the slides may particularly comprise a component. Here, the components may be configured in the same or in a different manner. It may preferably be provided that one or a plurality of slides also each comprise a plurality of components. For example, a slide may comprise two components. Due to the differing interference signals which are caused by the different components in the receiving coil, an identification of the individual slides or, respectively, vehicles is advantageously allowed for. In this respect, the slides have an individual identification. Thus, they may be unambiguously distinguished from one another. This unambiguous identification furthermore particularly allows for selectively monitoring signs of wear at the individual slides.

The invention claimed is:

1. A position detection device for detecting a position of a movable element in a drive device, comprising:
   a carrier having two detecting modules for detecting a position of the movable element, the detecting modules being arranged side-by-side at a predetermined distance and without overlapping;
   the detecting modules each comprising an energizing coil and a receiving coil assigned to the energizing coil and comprising a geometry having one period, an excitation pulse of the energizing coil inducing an electrical voltage in the receiving coil;
   the detecting modules being configured to detect a change in the electrical voltage induced in the receiving coil owing to the moveable element and to output a position signal when detecting the movable element, so that during a shift of the movable element along the two detecting modules over the predefined distance this distance may be measured as a reference distance on the basis of the position signals.

2. The position detection device according to claim 1, the coils having a sinusoidal geometry and a number of sinusoidal waves equaling at least 1.

3. The position detection device according to claim 1, a width of the energizing coil being at least 2.5 periods.

4. The position detection device according to claim 1, comprising the movable element which comprises a component with electrically conductive areas, which each have a width of half a period, and a respective distance between two areas being half a period.

5. The position detection device according to claim 1 having two carriers which are arranged side-by-side on the travel path, a distance being provided between the two carriers, the carriers each comprising two detecting modules for detecting the position of the movable element, the detecting modules being arranged side-by-side at the predetermined distance and without overlapping,
   the detecting modules being configured to output the position signal when detecting the movable element, so that during the shift of the movable element along the two detecting modules over the predefined distance this distance may be measured as the reference distance on the basis of the position signals, and
   so that during the shift of the movable element along the two carriers over the distance an absolute value of the distance may be determined on the basis of the reference distance.

6. The position detection device according to claim 1, comprising the movable element, wherein a length of the movable element is larger than the predefined distance.

7. The position detection device according to claim 1, wherein the carrier comprises a detecting area configured adjacently to the detecting modules and extending along the first detecting module over the predefined distance to the second detecting module, a further detecting module for detecting a position of the movable element being arranged in said detecting area, the further detecting module being configured to output a position signal when detecting the movable element.

8. The position detection device according to claim 1, a further electrically conductive area being formed which is arranged below the electrically conductive areas opposite to the detecting area.

9. A drive device comprising:
   at least a movable element;
   a travel path; and
   a position detection device having two carriers which are arranged side-by-side on the travel path, a distance being provided between the two carriers, the carriers each comprising two detecting modules for detecting a position of the movable element, the detecting modules being arranged side-by-side at a predetermined distance and without overlapping;
   the detecting modules being configured to detect a change in an electrical voltage owing to the moveable element and to output a position signal when detecting the movable element, so that during a shift of the movable element along the two detecting modules over the predefined distance this distance may be measured as a reference distance on the basis of the position signals, and so that during a shift of the movable element along the two carriers over the distance an absolute value of the distance may be determined on the basis of the reference distance;

wherein a length of the movable element is larger than both the predefined distance provided between two detecting modules of each carrier and the distance provided between the two carriers.

10. The drive device according to claim 9, the detecting modules each comprising an energizing coil and a receiving coil assigned to the energizing coil and comprising a geometry having one period.

11. The drive device according to claim 10, the detecting modules each comprising a plurality of receiving coils arranged side-by-side.

12. The drive device according to claim 10, the coils having a sinusoidal geometry and a number of sinusoidal waves equaling at least 1.

13. The drive device according to claim 10, a width of the energizing coil being at least 2.5 periods.

14. The drive device according to claim 10, comprising the movable element which comprises a component with electrically conductive areas, which each have a width of half a period, and a respective distance between two areas being half a period.

15. A drive device comprising:
a first movable element having a first electrically conductive area;
a second movable element having a second electrically conductive area;
a travel path; and
a carrier having a first detecting module and a second detecting module, the detecting modules each for detecting a position of the movable elements, the first detecting module being arranged upon the second detecting module, the detecting modules each comprising an energizing coil and a receiving coil assigned to the energizing coil and comprising a geometry having one period;
the detecting modules being configured to output a position signal when detecting the movable elements;
wherein the first conductive area of the first movable element and the second conductive area of the second movable element have differing configurations; and
wherein the first conductive area of the first movable element causes a different interference with the second detecting module than the second conductive area of the second movable element.

16. The drive device according to claim 15, the first detecting module having two detecting module elements for detecting a position of the movable element, the detecting module elements being arranged side-by-side at a predetermined distance and without overlapping,
the detecting module elements each comprising an energizing coil and a receiving coil assigned to the energizing coil and comprising a geometry having one period; and
the detecting modules being configured to output a position signal when detecting the movable elements, so that during a shift of any of the movable elements along the two detecting module elements over the predefined distance this distance may be measured as a reference distance on the basis of the position signals.

17. The drive device according to claim 16, having two carriers which are arranged side-by-side on the travel path, a distance being provided between the two carriers,
the detecting module elements of the first detecting module of each earner being configured to output the position signal when detecting the movable element, so that during the shift of any of the movable elements along the two detecting module elements over the predefined distance this distance may be measured as the reference distance on the basis of the position signals, and
so that during the shift of the movable element along the two carriers over the distance an absolute value of the distance may be determined on the basis of the reference distance.

18. The drive device according to claim 16, comprising the movable element, wherein a length of each movable element is larger than the predefined distance.

* * * * *